US012231380B1

United States Patent
Rodgers et al.

(10) Patent No.: US 12,231,380 B1
(45) Date of Patent: Feb. 18, 2025

(54) TRIGGER-BASED TRANSFER OF CONVERSATIONS FROM A CHATBOT TO A HUMAN AGENT

(71) Applicant: Oracle International Corporation, Redwood Shores, CA (US)

(72) Inventors: Michael Patrick Rodgers, Lake Oswego, OR (US); Eric L. Sutton, Naperville, IL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/485,053

(22) Filed: Oct. 11, 2023

(51) Int. Cl.
*H04L 51/02* (2022.01)
*G06F 40/20* (2020.01)

(52) U.S. Cl.
CPC .............. *H04L 51/02* (2013.01); *G06F 40/20* (2020.01)

(58) Field of Classification Search
CPC ................................ H04L 51/02; G06F 40/20
See application file for complete search history.

(56) References Cited

U.S. PATENT DOCUMENTS

| 11,436,416 | B2* | 9/2022 | Beaver | G06F 18/2178 |
| 11,893,356 | B1* | 2/2024 | Yannam | G06F 3/0481 |
| 2019/0052584 | A1* | 2/2019 | Barve | G06Q 10/04 |
| 2022/0070296 | A1* | 3/2022 | Friio | H04M 3/5191 |
| 2022/0086108 | A1* | 3/2022 | Higgins | G06F 18/24 |
| 2023/0199118 | A1* | 6/2023 | Koneru | G10L 15/26 379/88.01 |
| 2023/0410801 | A1* | 12/2023 | Mishra | H04M 3/5175 |
| 2024/0089372 | A1* | 3/2024 | Kaniganti | H04M 3/5307 |

* cited by examiner

*Primary Examiner* — Philip C Lee
(74) *Attorney, Agent, or Firm* — Invoke

(57) ABSTRACT

Techniques for triggering a transfer of a chat conversation with a user from a chatbot to a human agent based on detection of transfer criteria are disclosed. The chatbot uses natural language processing and a generative model to collect and organize information from the chat conversation to present to the human agent in a report when the chat conversation is transferred to the human agent. The chat conversation is transferred to the human agent by presenting the report and a graphical chat interface to the human agent. The graphical chat interface displays messages from chat conversation between the human agent and the user and displays messages from chat conversations between the human agent and multiple other users. Transferring the chat conversation from the chatbot to the human agent includes presenting interface elements to the human agent for receiving user input from the human agent for transmission to the user.

23 Claims, 5 Drawing Sheets

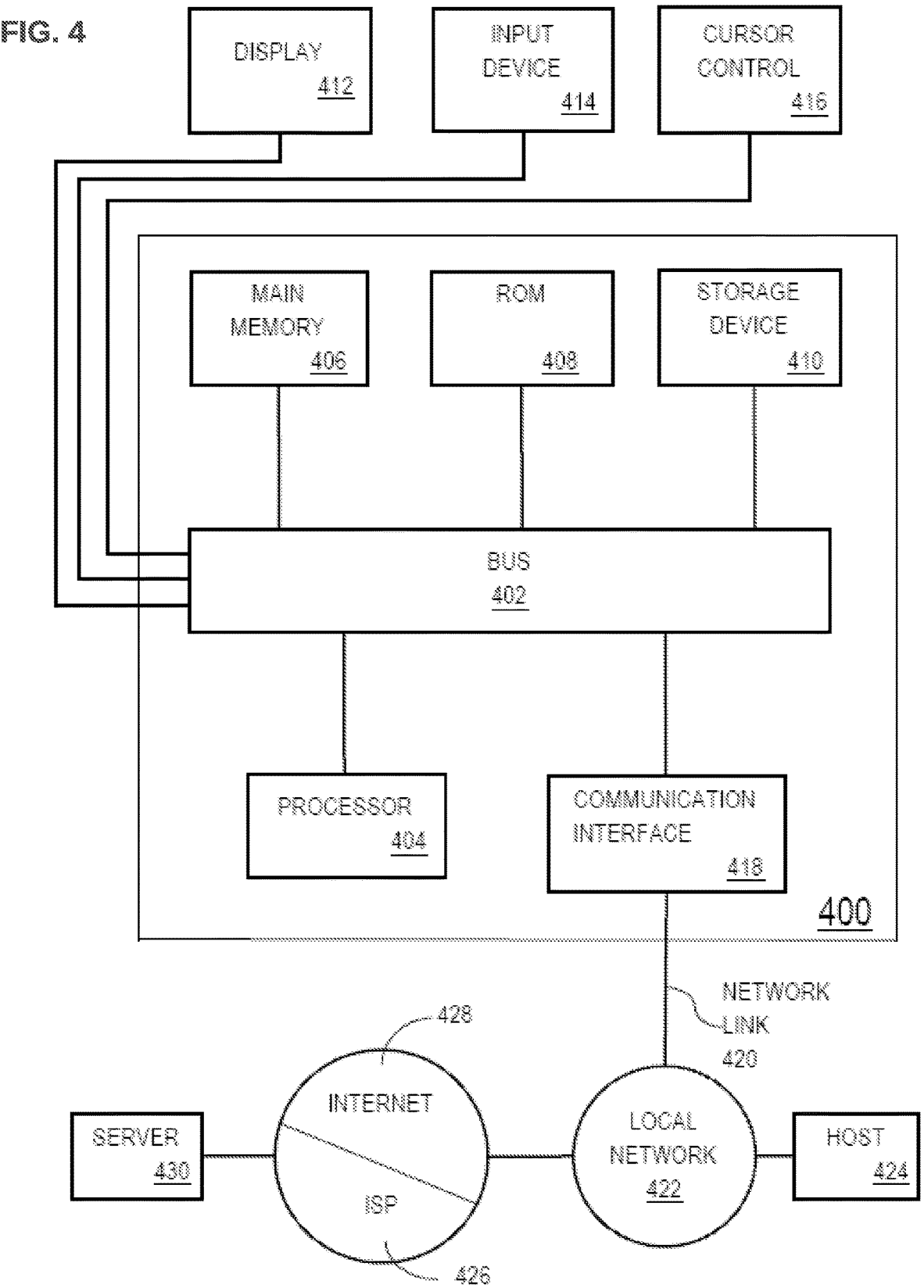

TRIGGER-BASED TRANSFER OF CONVERSATIONS FROM A CHATBOT TO A HUMAN AGENT

TECHNICAL FIELD

The present disclosure relates to the use of chatbots in the role of customer service support. In particular, the present disclosure relates to using generative AI chatbots to gather and enhance information for facilitating resolution of a service request.

BACKGROUND

When a user, e.g., client, customer, patient, requires technical support, has a product or service inquiry, requires medical information, or otherwise is in need of assistance, immediately connecting the user to a human agent is not feasible, nor is it practical. To avoid incredibly long hold times, users making a service request to, for example, customer support, are often first directed to a chatbot. Unfortunately, conventional chatbots tend to be extremely rudimentary, often following a very minimal, fixed directed graph of states. Many conventional chatbots do not offer the user the ability to type a response. Instead, conventional chatbots provide choices among a handful of canned responses, none of which may be applicable to the service request.

When the user is finally able to converse with a human agent, the conversation between the user and the human agent is asynchronous. Often, the human agent is in conversation with several other users at the same time. Responses from the human agent-even trivial responses like "yes" or "no"—may take several minutes. Understandably, the user will do something else in the background to entertain themselves while passing the time between responses from the human agent, thereby distracting the user and delaying responses from the user. In addition, information gathering during a conversation with a conventional chatbot is exceedingly inefficient.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

Figure 1:
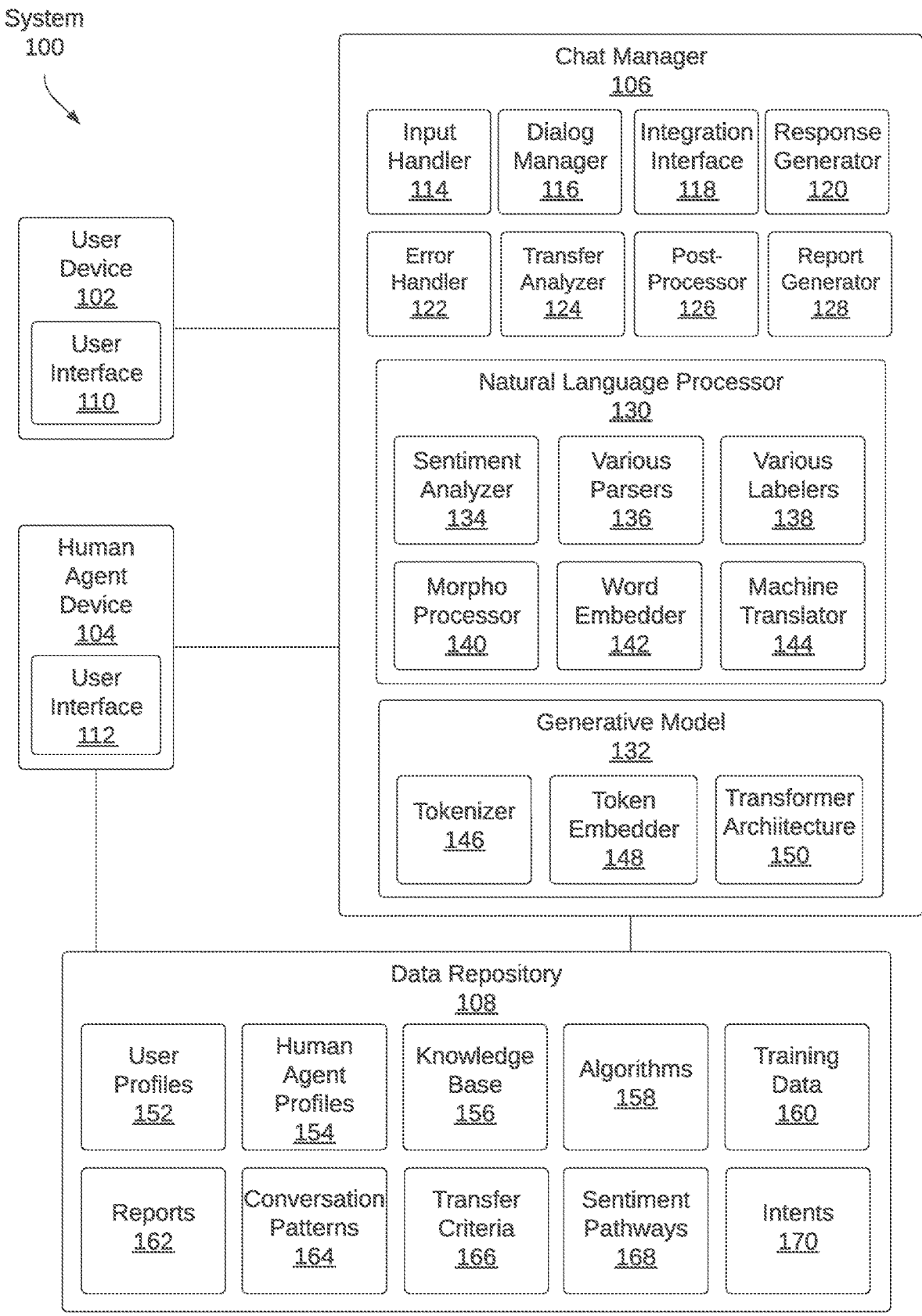
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CUSTOMER SERVICE CHATBOT SYSTEM
3. TRANSFERRING A CHAT CONVERSATION TO A HUMAN AGENT
4. EXAMPLE CHAT CONVERSATION
5. ENHANCING A CHATBOT CONVERSATION FOR PRESENTATION TO A HUMAN AGENT
6. GENERATING RECOMMENDATIONS ASSOCIATED WITH OUTBOUND CHATBOT MESSAGES
7. REAL-TIME RECONFIGURATION OF A CHATBOT DURING CHATBOT EXECUTION
8. SEAMLESS TRANSITIONING CONVERSATIONS BACK AND FORTH BETWEEN HUMAN AGENTS AND CHATBOTS
9. HARDWARE OVERVIEW
10. MISCELLANEOUS; EXTENSIONS

1. General Overview

One or more embodiments trigger a transfer of a chat conversation with a user from a chatbot to a human agent based on detection of transfer criteria. The chatbot uses natural language processing and a generative model(s) to collect and organize information from the chat conversation to present to the human agent in a report when the chat conversation is transferred to the human agent. The report includes a summary generated by the chatbot for more efficient review by the human agent.

Over the course of a chat conversation, the chatbot generates outbound messages requesting information related to a service request. The outbound messages are transmitted to a client device of the user. The chatbot receives inbound messages from the user providing information relating to the service request. In response to the inbound messages, the chatbot may detect transfer criteria to transfer the chat conversation with the user from the chatbot to a human agent.

One or more embodiments generate a report corresponding to the chat conversation and based at least on the inbound messages when the transfer criteria to transfer the chat conversation to the human agent is detected. Sections of the report that are determined by the chatbot to be of greater significance or higher relevance in resolving the service request may be enhanced for more efficient viewing by the human agent. These sections of greater significance or higher relevance may include color coding, text formatting, inline tags, icons or emojis, speech bubbles, bullet points or numbered lists, hover over or tooltips, contextual tags, timestamps, and human agent customizable features.

One or more embodiments transfer the chat conversation to the human agent by presenting the report and a graphical chat interface to the human agent. The graphical chat interface displays messages from chat conversation between the human agent and the user and displays messages from chat conversations between the human agent and multiple other users. Transferring the chat conversation from the chatbot to the human agent includes presenting interface elements to the human agent, in association with the chat interface, for receiving user input from the human agent for transmission to the user.

One or more embodiments determine the transfer criteria by determining a type of service request based on the inbound messages and determining the transfer criteria based on the type of the service request. The transfer criteria may include user sentiment criteria. Detecting that the transfer criteria has been met may include determining user sentiment associated with the user based at least on the inbound messages and determining that the user sentiments meets the user sentiment criteria.

One or more embodiments detect that the transfer criteria has been met by determining that the information in the inbound messages meets a completion criteria associated with the service request. In response to detecting that the transfer of the chat conversation from the chatbot to the human agent is complete, the chat conversation with the chatbot may be terminated.

One or more embodiments described in this Specification and/or recited in the claims may not be included in this General Overview section.

2. Customer Service Chatbot System

FIG. 1 illustrates a system 100 in accordance with one or more embodiments. As illustrated in FIG. 1, system 100 includes a user device 102, a human agent device 104, a chat manager or chatbot 106, and a data repository 108. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the user device 102 includes any device through which a user may communicate with the chat manager 106. The user device 102 may be a laptop computer, a desktop computer, a tablet, a smartphone or other mobile device, a smart TV or other internet ready device. The user device 102 may include a user interface 110 for engaging the chat manager 106. The user interface 110 renders user interface elements and receives input via user interface elements. Examples of interfaces include a graphical user interface (GUI), a command line interface (CLI), a haptic interface, and a voice command interface.

In an embodiment, different components of user interface 110 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 110 is specified in one or more other languages, such as Java, C, or C++.

In one or more embodiments, the user interface 110 enables a user to enter messages for querying the chat manager 106 and receive messages from the chat manager 106 in response to the user queries for review. One or more embodiments of the user interface 110 includes interface elements corresponding to the responses provided by the chat manager 106. In embodiments, from a perspective of the user, responses output to the user device 102 generated by the chat manager 106 are indistinguishable from responses provided to the user device 102 by a human agent.

In embodiments, the interface elements invite a user to provide their feedback concerning a particular response and/or the overall conversation. In embodiments, feedback request from the user includes rating user satisfaction of a response. Examples of user interface elements include checkboxes, radio buttons, dropdown lists, list boxes, buttons, toggles, text fields, date and time selectors, command lines, sliders, pages, and forms. In some embodiments, the interface element includes a chat interface allowing a user to type a comment related to a response.

In embodiments where the user accesses the chat manager 106 through a website or app, the website or app includes a designated area or chat interface for users to type their messages and interact with the chat manager 106. In one or more embodiments, a user initiates a chat conversation with the chat manager 106 by clicking on a chat box or input filed and entering a query.

In some embodiments, the user accesses the chat manager 106 through a messaging platform, for example, Facebook Messenger, WhatsApp, Slack, or Telegram. The user may initiate a conversation by opening a profile for the chat manager or initiating a conversation with an account of the chat manager 106. In one or more embodiments, opening a profile of the chat manager 106 includes searching for the name of the chat manager 106, clicking on link for the chat manager 106, or scanning a QR code available to the user. In one or more embodiments, the name of the chat manager 106 includes the name of the business, entity, industry, and/or organization to which the chat manager 106 supports.

In one or more embodiments, a user engages the chat manager 106 through a voice assistant, e.g., Amazon Alexa, Google Assistant, or Apple Siri, or other voice activated system. In embodiments, voice assistants provide for a hands-free and voice-based interaction with the chat manager 106. In some embodiments, the voice assistant processes the voice input and communicates with the chat manager 106 to obtain responses. In embodiments, the responses from the chat manager 106 are delivered to the user as voice output through the voice assistant.

One or more embodiments include the human agent device 104 as a workstation operated by a human agent for monitoring one or more chat conversations. In embodiments, the human agent device 104 includes any device through which the human agent may communicate with the chat manager 106. In some embodiments, the human agent device 104 includes a user interface 112 for engaging with the chat manager 106. The user interface 112 renders user interface elements and receives input via user interface elements. Examples of interfaces include a graphical user interface (GUI), a command line interface (CLI), a haptic interface, and a voice command interface.

In embodiments, different components of user interface 112 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 112 is specified in one or more other languages, such as Java, C, or C++.

In one or more embodiments, the human agent device 104 is able to provide audible and/or haptic alerts. In embodiments, the audible and/or haptic alerts are provided to the human agent in addition to visual alerts. In some embodiments, the volume and/or intensity of the alert is determined by the severity of the issue for which the human agent is being alerted. For example, an issue requiring immediate attention of the human agent is indicated by an increased audible alert, e.g., a loud ding, and/or an increased haptic alert, e.g., intense vibration.

In one or more embodiments, the user interface 112 of the human client device 104 includes one or more displays that permit viewing of dialogue from one or more chat conversation. In embodiments, the human agent may choose between viewing dialogue of a single chat conversation or viewing dialogue of multiple chat conversations simultaneously. In one or more embodiments, individual chat conversations are provided as individual tabs or windows that may be selected by the human agent to permit viewing of dialogue from the corresponding chat conversation. The displayed dialogue may include any or all the dialogue of the chat conversations. In some embodiments, the interface elements allow the human agent to scroll through the dialogue of the chat conversation to review earlier messages in the chat conversation. In embodiments, the display of the dialogue for the chat conversations on the user interface 112 occurs in real-time or near real-time.

One or more embodiments of the user interface 112 includes interface elements corresponding to the responses generated by the chat manager 106. Through the user interface 112 of the human agent device 104, a human agent may monitor the dialogue of the chat conversation between the user device 102 and the chat manager 106.

In one or more embodiments, the user interface 112 displays user sentiment for the overall conversation. In some embodiments, an indication of user sentiment is displayed for each response. In embodiments, a green background or text or highlight or marker is indicative of positive sentiment, yellow is indicative of a neutral sentiment, and red is indicative of negative sentiment. In some embodiments, changes in user sentiment are indicated by changing the color of the background or text or highlighting or markings. In embodiments, the background and/or text color of the individual message changes when user sentiment changes. In some embodiments, the background or text color of the entire chat conversation changes to provide indication to the human agent that the sentiment has changed. In embodiments, the indication of change in sentiment is accompanied by an audible and/or haptic alert.

In one or more embodiments, user sentiment is tracked as a combination of sentiment polarity (positive or negative) and sentiment magnitude (or intensity). Sentiment polarity indicates whether the sentiment expressed in a piece of text of a chat conversation is positive, negative, or neutral. For example, positive sentiment is represented as a positive number, e.g., 0.8 or 1, negative sentiment is represented as a negative number, e.g., −0.6 or −1, and a neutral sentiment is represented as 0 or a value close to 0. Sentiment magnitude or intensity measures the strength or degree of sentiment expressed in the text of a chat conversation. Common representations of sentiment magnitude include a normalized scale, e.g., a value between 0 and 1, where 0 represents no sentiment or neutral, and 1 represents the highest intensity of sentiment, or a larger scale, e.g., a value of between 0 and 10, where 0 is no sentiment, and 10 is the highest intensity. Tracking sentiment polarity and magnitude allows for more nuanced insights into the sentiment of the text data. For example, a text with a positive sentiment polarity, e.g., 0.8, and a high sentiment magnitude, e.g., 0.9 on a normalized scale or 9 on a 0-10 scale, indicates very strong positive sentiment, while a text with a positive sentiment polarity, e.g., 0.6, and a low sentiment magnitude, e.g., 0.2 on a normalized scale or 2 on a 0-10 scale, suggests mild or weak positive sentiment.

In one or more embodiments, the human agent uses interface elements to provide approval of a message generated by the chat manager 106. As will be described in further detail below, approval of a message generated by the human agent may be required when a message is determined by the chat manager 106 to be controversial, and time is allotted to permit approval by the human agent when a message determined by the chat manager 106 to be potentially controversial. In some embodiments, human agent intervention or approval is required and/or permitted when the chat manager 106 lacks confidence in the response and/or when the chat manager 106 is only partially confident in the response. The interface elements may provide the human agent with an ability to speed up, slow down, or pause the chat conversation. In some embodiments, the interface elements provide the human agent the ability to take over the chat conversation from the chat manager 106. In embodiments, the interface elements provide the human agent with an ability to transfer the chat conversation back over to control of the chat manager 106.

In one or more embodiments, the user interface 112 of the human client device 104 includes a chat box for the human agent to enter messages for responding to the user device 102. The user interface 112 may include a search box or other component that provides the human agent with access to a knowledge base 156 or other resources for the human agent to search for a response to a user inquiry. In some embodiments, the chat manager 106 may continue to monitor the chat conversation and generate suggested response for the human agent to use when responding to the user.

In one or more embodiments, the user interface 112 of the human agent device 104 includes interface elements that permit the human agent to modify the configuration of the chat manager 106. In some embodiments, the interface elements allow the human agent to easily modify the configuration of the chat manager 106. Interface elements may include checkboxes, radio buttons, dropdown lists, list boxes, buttons, toggles, text fields, date and time selectors, command lines, sliders, pages, and forms.

In some embodiments, modifications to the configuration of the chat manager 106 are immediate and affect all subsequent messages generated by the chat manager 106. In embodiments, the interface elements may provide the human agent the ability to regenerate a pending message generated by the chat manager 106, taking into account the most recent modification(s).

In one or more embodiments, the interface elements allow the user to adjust a level of an attribute of the chat manager 106. For example, the interface elements may provide a human agent with the ability to adjust the level of risk the chat manager 106 takes in generating a response. In one embodiment, the interface element includes a slider for risk, with "take more risk" at one end of the slider, i.e., "use the extent of the information available", and take less risk at an opposite end of the slider, i.e., "be more careful". In this manner, the movement of the slider influences the internal parameters, e.g., weights, of the language model. These wights are responsible for determining creativeness or robotic-ness of the generated responses. Moving the slider towards the "robotic" end would result in responses that are more methodical and precise, akin to how a robot might respond. Conversely, moving the slider towards "creative" would encourage the chat manager 106 to generate more imaginative or nuanced responses. A more creative setting may encourage the chat manager 106 to make use of implied information or context in its response, rather than just directly stated facts. The optimal setting for the slider is typically somewhere in the middle, with a balanced approach most likely to yield the most effective responses. Depending on the specific problem or context at hand, the human agent may adjust the slider to fine-tune the responses. Different situations may call for different levels of creativity or precision. The system sets limits on how creative or robotic the response may be. These are absolute boundaries within which the slider can operate. The human agent has the ability to adjust the slider within these predefined boundaries, thereby giving the human agent a degree of control over the behavior of the chat manager 106. Constraints may be set on the backend to prevent the human agent from pushing the chat manager 106 beyond certain limits. These constraints ensure that the responses generated by the chat manager 106 remain within acceptable and safe parameter. In some embodiments, the interface elements allow the human agent to approve a message generated by the chat manager 106 and use a slider to modify the risk level of subsequent response generated by the chat manager 106.

In one or more embodiments, the interface elements include a chat box for the human agent to enter an internal note or comment for later use. In some embodiments, the user interface 112 includes interface element for marking a response as exceptional. In embodiments, exceptionally bad or nonsensical responses are flagged by the human agent for review and analysis. In some embodiments, the comment relates to the correctness of the response, the tone of the response, the reaction of the user to the response, the length of the response, or any other factor.

In some embodiments, the human agent device 104 includes multiple workstations with each of the workstations operated by a human agent. Having multiple human agents monitor the same conversations lessens the likelihood that there will be no human agent available when a transfer criteria is detected in any of the multiple conversations and increases the likelihood that a human agent having the requisite experience or knowledge for resolving a service request will be available when the transfer criteria is detected in any of the chat conversations.

In one or more embodiments, the chat manager or chatbot 106 refers to hardware and/or software configured to perform operations described herein for handling a service request. Examples of operations for handling a service request are described below with reference to FIG. 2. In one or more embodiments, the chat manager 106 is a computer program designed to simulate human conversation and interact with users.

In an embodiment, the chat manager 106 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In embodiments, the chat manager 106 is configured for a specific purpose or domain of focus, e.g., customer support, information retrieval, or task automation. Although the aspects of the disclosure will be described with reference to the use of the chat manager 106 in a customer support role, the operation, analysis, and reporting of the chat manager 106 may be applicable to other purposes.

Although all outbound messages to the user device 102 are received from the chat manager 106, distinction is made between messages generated by the chat manager 106 and messages prepared by the human agent. Unless noted as being from the human agent, the messages output to the user device 102 are generated by one or more components of the chat manager 106.

Certain service requests may require human intervention when the service request involves complex or critical tasks that cannot be fully automated or require human judgment, expertise, or decision-making. For example, exceptional cases, high-risk situations, complex problem solving, personalized interactions, legal or regulatory compliance, and quality assurance may require human intervention.

As will be described in detail below, in one or more embodiments, the chat manager 106 uses various techniques, including natural language processing, rule-based approaches, retrieval-based approaches, and generative models to generate natural language responses to natural language input from a user. Rules-based techniques rely on predefined rules or decision trees to generate responses, retrieval-based techniques retrieve pre-existing responses from a knowledge base in response to input from the user, and generative models, e.g., ChatGPT, generate responses based on the learned patterns in a large corpus of text data.

In one or more embodiments, the chat manager 106 uses a natural language processor 130 to understand user input, one or more generative models 132, e.g., GPT model, to generate responses, and post-processing techniques to refine the responses. In one or more embodiments, in addition to the natural language processor 130 and the generative models, the chat manager 106 includes an input handler 114, a dialog manager 116, an integration interface 118, a response generator 120, an error handler 122, a transfer analyzer 124, a post-processor 126, and a report generator 128. Although some components are shown and described as belonging to the natural language processor 130, and other components are shown and described as belonging to the generative model 132, and still other components are shown and described as belonging to the chat manager 106, the various components may belong to or be used by any or all of the chat manager 106, the natural language processor 130, and the generative model 132.

In one or more embodiments, the input handler 114 of the chat manager 106 receives and processes user inputs received from the user device 102. The user input may be in the form of text messages, voice commands, or any other input format supported by the chat manager 106. In some embodiments, the input handler 114 processes the user input, extracts relevant information, and performs initial intent recognition. In embodiments, the input handler 114 is trained to understand the immediate intention of the user within the context of the current input.

In one or more embodiments, prior to processing the user input, the input handler 114 may perform pre-processing steps to clean and normalize the input data. In embodiments, pre-processing includes removing unnecessary characters, converting the input to lowercase, and applying other text normalization techniques. In some embodiments, the input handler 114 tokenize the input text, including breaking the input text down into individual tokens or units of meaning. In embodiments, tokenization is necessary for further processing and analysis of the user input.

In one or more embodiments, the input handler 114 applies intent recognition techniques to determine the type of service request and intention or purpose behind the service request. In some embodiments, intent recognition involves analyzing tokens and identifying specific intent or action a user is seeking. In embodiments, intent recognition assists in guiding the generated response and determining the appropriate course of action. Although described as being performed by the input handler 114, in some embodiments, intent recognition is performed by a separate component or other component(s) making up the chat manager 106.

In one or more embodiments, the input handler 114 performs entity extraction. In some embodiments, entity extraction includes identifying and extracting specific pieces of information, such as names, dates, locations, or any other relevant entities mentioned in the user input. In embodiments, the information extracted by the input handler 114 is used for further processing and/or for fulfilling the service request.

In one or more embodiments, the input handler 114 formats the extracted information into a structured format or prepares the extracted information for further processing by other components of the chat manager 106. In embodiments, the formatting step ensures that the extracted data is in a suitable form for downstream processing.

In one or more embodiments, the dialog manager 116 of the chat manager 106 is responsible for managing the flow and context of the chat conversation throughout the chat manager 106. In embodiments, the dialog manager 116 handles tasks such as maintaining the state of the conversation, tracking user preferences or context, and making decisions about the responses generated by the chat manager 106 based on the recognized intent. In some embodiments, the dialog manager 116 uses the recognized intent, along with conversation context, to determine appropriate next steps, such as selecting an appropriate response, invoking specific services, or routing the chat conversation to different parts of the system 100.

In one or more embodiments, the dialog manager 116 performs intent recognition. As noted above, intent recognition focuses on identifying the intention of a user based on the input. In embodiments, the intent recognition considers the broader conversation context, including the history of user inputs and responses, to understand the intent within the context of the ongoing chat conversation. In embodiments, intent recognition assists in determining the appropriate action or response based on the recognized intent.

In one or more embodiments, the integration interface 118 of the chat manager 106 provides a means for communication and integration with external systems, services, or APIs. In embodiments, the integration interface 118 allows the chat manager 106 to access and exchange information with external resources to fulfill service requests or provide relevant responses. In some embodiments, the integration interface 118 operates by facilitating data transfer, invoking external services, and receiving responses from those services.

In one or more embodiments, the integration interface 118 establishes connections or integrations with external systems, services, or APIs. In embodiments, establishing connection includes setting up authentication credentials, configuring endpoints, defining data formats, and/or specifying access permissions as required by the integration. In some embodiments, when the chat manager 106 interacts with an external resource, the chat manager 106 may utilize the integration interface 118 to exchange data. In embodiments, the integration interface 118 prepares necessary data or parameters to be sent to an external service. In some embodiments, data sent to an external service includes user input, context information, or any relevant details required by the external resource to process the request.

In one or more embodiments, the chat manager 106 initiates a request to the external system or service via the integration interface 118. In embodiments, the chat manager 106 sends the prepared data, using standard protocols such as HTTP, REST, SOAP, or specific APIs provided by the integration interface 118. In some embodiments, the request is sent to the appropriate endpoint or service, along with any required headers or authentication tokens. The integration interface 118 may receive the response from the external system or service. In one or more embodiments, the integration interface 118 handles the response by parsing and extracting relevant information or data. The response may contain data to be used in generating a response to the user, or triggers for further actions within the chat manager 106. In some embodiments, the integration interface 118 performs data transformation or normalization to adapt the received data into a suitable format for the chat manager 106 or other components of the system 100. In embodiments, data transformation and normalization ensure that data from the external service may be easily processed and utilized within the context of the chat manager 106. In some embodiments, the integration interface 118 passes the extracted or transformed data back to relevant components within the chat manager 106. In embodiments, extracted or transformed data is used to generate appropriate responses, update conversation context, or trigger subsequent actions based on the integration results.

In one or more embodiments, the response generator 120 of the chat manager 106 generates appropriate responses to user inputs or queries. In some embodiments, the response generator 120 plays a crucial role in the conversational flow of the chat manager 106 by generating relevant and contextually appropriate responses. In embodiments, the response generator 120 accounts for various factors in generating effective responses, including intent of the user, current conversation context, available knowledge or information, and any predefined rules or guidelines.

In one or more embodiments, the response generator 120 considers the intent of the user, which represents the purpose or goal behind the user's input. In embodiments, use of intent recognition techniques to identify the intention of a user allows the response generator 120 to generate a response that aligns with the service request.

In one or more embodiments, the response generator 120 accounts for context of a conversation. In embodiments, the response generator 120 considers the history of the chat conversation, including previous user inputs and responses from the chat manager 106, to ensure that the generated response is relevant and coherent with the ongoing dialogue of the chat conversation. In some embodiments, context awareness assists in maintaining a smooth and coherent conversation flow.

In one or more embodiments, the response generator 120 accesses a knowledge base 156 or other information repository to retrieve relevant information to include in a generated response. In some embodiments, retrieving relevant information includes querying databases, accessing APIs, or searching through structured or unstructured data sources to gather necessary information. In embodiments, the response generator 120 utilizes the integration interface 118 of the chat manager 106 to access external information or access the external information independently.

In one or more embodiments, the response generator 120 employs natural language generation techniques to generate responses that are fluent and human-like. The response generator 120 may utilize templates, rules, and natural language processing (NLP) models to construct grammatically correct and contextually appropriate responses.

In some embodiments, the response generator 120 incorporates personalization aspects to tailor the responses based on user preferences, historical interactions, or user profiles 152. In embodiments, personalization enhances the experience of the user by providing more personalized and relevant responses. For example, the response generator 120 may begin a chat conversation commenting on the weather at the user's location, or by commenting about a previous chat conversation.

In one or more embodiments, the error handler 122 of the chat manager 106 handles and manages errors that occur during operation of the chat manager 106 to ensure a smooth and user-friendly conversational experience. In some embodiments, the error handler 126 is responsible for detecting errors or exceptional conditions that may arise during execution of the chat manager 106. Errors may include scenarios such as invalid user inputs, system failures, network errors, or any other unexpected situations.

In one or more embodiments, the error handler 122 defines strategies for handling different types of errors. In embodiments, the error handler 122 determines the appropriate course of action when an error occurs. In some embodiments, strategies for handling errors include display of error messages, prompts for clarifications, providing helpful suggestions, or escalating to a human agent.

In one or more embodiments, when an error occurs, the error handler 122 generates error messages or prompts to inform a human agent, a system administrator, and/or technical support about the issue. In embodiments, these messages are informative, clear, and concise, assisting the human agent in understanding what went wrong and potentially guiding them on how to proceed or correct the error.

In one or more embodiments, the error handler 122 implements fallback mechanisms when the chat manager 106 encounters an unsupported user query or input. In some embodiments, fallback mechanisms include providing default responses, asking the user to rephrase the question, or offering alternative options to continue the chat conversation.

In one or more embodiments, the error handler 122 includes functionalities for logging and monitoring errors. In embodiments, the error handler 122 keeps a record of encountered errors, timestamps, and other relevant information for later analysis and troubleshooting. In some embodiments, error logging helps developers identify recurring issues, track performance, and improve the system over time.

In some embodiments, when an error cannot be resolved autonomously by the chat manager 106, the error handler 122 triggers an escalation process to involve human agents or customer support staff. In some embodiments, where the nature of the error is non-technical, the error is treated as a transfer criteria, as will be described below with reference to the transfer analyzer 124, and the chat conversations is transferred to a human agent, along with the dialogue of the chat conversation, a report summarizing and detailing the service request, and other information that a human agent may find pertinent to resolving the service request.

In one or more embodiments, the transfer analyzer 124 of the chat manager 106 analyzes a chat conversation between a user and the chat manager 106 and determines when a transfer criteria is achieved. In embodiments, the transfer analyzer 124 assesses context of a chat conversation and determines whether to transfer control to human agent based on specific transfer criteria.

In one or more embodiments, the transfer analyzer 124 monitors and analyzes the ongoing chat conversation, taking into account various factors such as intent of the user, complexity of the inquiry, confidence in a generated response, or predefined rules. In embodiments, the transfer analyzer 124 defines the criteria or conditions that need to be met for a transfer to occur. In some embodiments, the transfer criteria is based on factors like a request for human assistance by the user, an inability to provide a satisfactory response, or identification of specific keywords or triggers indicating the need for specialized knowledge or escalation. In one or more embodiments, the transfer criteria is based on user sentiment or perceived state of being of the user.

In one or more embodiments, based on the conversation analysis and the transfer criteria, the transfer analyzer 124 determines when the conversation should be transferred to a human agent. In some embodiments, when the transfer criteria is met, the chat conversation is automatically transferred from control of the chat manager 106 to control of a human agent. In embodiments, the transfer of the chat conversation to the human agent is initiated by the transfer analyzer 124. Alternatively, when the transfer criteria is met, the human agent is provided with indication that the transfer criteria has been met and the human agent initiates the transfer of the chat conversation.

In one or more embodiments, the post-processor 126 of the chat manager 106 refines and enhances the responses generated by the chat manager 106 before the chat manager 106 outputs the responses to the user device 102. In some embodiments, post-processing includes applying various techniques and modifications to improve the quality, coherence, and overall user experience of the responses. In embodiments, post-processing includes cleaning up generated text to remove any artifacts, inconsistencies, or unnecessary elements that may have been introduced during the response generation process. In some embodiments, cleaning up the text includes removing redundant words, correcting grammar or spelling errors, or ensuring proper punctuation and formatting.

In one or more embodiments, post-processing aims to ensure that the generated responses maintain coherence with the ongoing conversation and are contextually relevant. In embodiments, post-processing includes adjusting the response based on the previous inputs of the user or incorporating references to the conversation history to make the response more meaningful and coherent.

In one or more embodiments, post-processing is used to refine the tone and politeness of the generated responses. Post-processing may include adding polite phrases, using appropriate greetings or salutations, or adapting the language style to match preferences of the user or a desired persona of the chat manager 106. In some embodiments, post-processing aids in controlling the length of generated responses to ensure the responses are concise and easily digestible for the user. In embodiments, long and verbose responses are trimmed or summarized, while ensuring that the essential information or message is retained.

In one or more embodiments, post-processing includes handling any errors or inconsistencies that were missed during response generation. In embodiments, handling errors and inconsistencies include error detection and correction, validating the response against predefined rules or guidelines, or providing fallback options in case the generated response is deemed unsatisfactory.

In some embodiments, post-processing includes applying formatting or enriching the text with additional elements such as hyperlinks, images, or emojis to enhance the visual appeal or provide supplementary information in the responses.

In one or more embodiments, the report generator 128 of the chat manager 106 collects data from dialogue of a chat conversation concerning a service request. In some embodiments, the report generator 128 collects or gathers contextual information in real-time for providing to a human agent to which the chat conversation is transferred from the chat manager in the form of a report. In embodiments, the report is presented to the human agent when the conversation is transferred to the human agent. In embodiments, the report provides the human agent with all the information relevant to resolving the service request that was provided in the dialogue of the chat conversation.

In one or more embodiments, the report generator 128 uses machine learning models, including the generative model 132, to summarize the chat conversation and provides the summary as part of the report to the human agent. In some embodiments, portions of the chat conversation provided in the report and deemed, by one or more components of the chat manager 106, important or relevant to resolving the service request include enhancements for supporting the human agent in achieving a resolution to the service request. In embodiments, enhancements include one or more summaries, of the chat conversation or portions of the chat conversation and color coding, text formatting, inline tags, icons or emojis, speech bubbles, bullet points or numbered lists, hover over or tooltips, contextual tags, timestamps, and human agent customizable features of relevant portions of the chat conversation. Different colors may be used to highlight different types of information or topics. For example, green could be used for confirmed facts, yellow for pending information, and red for critical or urgent matters. Small, unobtrusive tags or icons may be attached next to important pieces of information or topics. Theses could indicate the nature of the information, e.g., "important", "urgent", "action required". Bold, italics, or underline may be used to emphasize key points or facts and draw attention to important information or topics. For example, "I have an iPhone 14" could be a supporting fact indicated by italics or underline and "internet connectivity" could be a troubleshooting topic in the conversation indicated by bolding or a different color. In this manner, the facts may be separated from the underlying questions that indicate the topic itself. Icons or emojis may be integrated into the text and/or summary to represent different types of information or topics. For example, a lightbulb emoji for insights or a clock emoji for time-sensitive information. Speech bubbles may be used to encapsulate important facts. Different shapes and/or style speech bubbles may be used to differentiate between different types of information. Lists may be used to present information in a structured and easily scannable format, thereby helping to break down complex information into manageable chunks. Hover over or tooltips features may be implemented to allow the human agent to hover over or click on a specific piece of information to reveal additional context or details. Contextual tags may be automatically generated based on the nature of the information. For example, a tag such as "customer name" or "order ID" may be automatically generated based on the content. Timestamps for time-sensitive information may be included to indicate when certain facts were provided or when the facts need to be addressed. User customizable features provide the human agent options for customizing the way information is highlighted or labeled based on preferences of the human agent.

Enhancements may include annotations or graphics allowing for quick review by a human agent. For example, when the chat manager 106 provided the user a step-by-step solution to a technical issue, the steps would be highlighted or color-coded in the summary. The report might also include annotations or graphics such as a checkmark next to successfully completed troubleshooting steps, to ensure quick and efficient review by the human agent.

In one or more embodiments, relevant portions of the chat conversation include information or data that was determined to be relevant in resolving previous chat conversations with similar service requests. For example, when the user is seeking assistance with a common billing issue, the chat manager 106 analyzes past chat conversations related to billing inquiries to identify patterns and successful resolution strategies. One or more summaries may be provided to the human agent of similar chat conversations from the past, showcasing how similar billing issues were resolved previously. These summaries may be color-coded for easy identification within the report. Additionally, relevant portions of the current chat conversation that align with successful past resolutions are highlighted or annotated, guiding the agent towards proven solutions.

In one or more embodiments, relevant information for enhancement includes identification of loops that were closed, loops that remain open, conversation paths that were avoided, and responses that were not given and an explanation of why the responses were not given. For example, the chat manager 106 detects that a loop remains open because the issue could not be fully addressed, and the report highlights the open loop and details the conversation path leading up to the transfer. This information serves as a cue for the human agent to follow up with the customer or conduct further research to close the loop. In another example, when a user seeks assistance with a billing issue, and during the chat conversation, the chat manager 106 inadvertently avoids discussing the user's payment history, which the chat manager 106 recognizes could have been important for resolving the issue. The report may provide an explanation of the avoided conversation path and why the conversation path was avoided. In yet another example, a user may ask a complex technical question to which the chat manager 106 cannot provide a direct answer because, e.g., the knowledge base of the chat manager 106 does not cover the topic. The report may include an explanation of why specific responses were not provided, such as lack of relevant information in the knowledge base or the complexity of the query.

In one or more embodiments, the report generator 128 ranks the portions of the chat conversation by relevance to resolving the service request. In some embodiments, more relevant portions of the chat conversation are ranked higher than less relevant portions of the chat conversation. For example, when a user contacts the chat manager 106 with a complex technical issue related to a software application, and during the conversation, the chat manager 106 provides a detailed step-by-step troubleshooting guide, while also engaging in casual conversation about unrelated topics. The report generator 128 employs a machine learning model to analyze the chat conversation and determine relevance. The report prioritizes the step-by-step troubleshooting guide and related technical discussions at the top, ensuring these highly relevant portions are prominently displayed for the human agent and the casual, unrelated conversation is ranked lower or excluded to provide a focused and efficient summary.

In one or more embodiments, portions of the chat conversation deemed to be less relevant or not relevant for resolving the service request are excluded by the report generator 128 from the report presented to the human agent. For example, during a chat conversation inquiring about a billing issue, the user digresses into a personal anecdote unrelated to the issue. The report generator 128 generates a report that excludes the unrelated personal anecdote, presenting only the portions of the chat conversation directly related to the billing issue.

In one or more embodiments, the ranking of the relevant portions of the chat conversation are customized to the human agent receiving the transferred chat conversation. For example, when a chat conversation is presented to a technical support specialist, the report ranks technical discussions higher, focusing on resolving the technical issue. Conversely, when the chat conversation is transferred to a sales specialist, the report emphasizes sales-related portions and downplays technical details. This streamlines the information presented to the human agent, focusing on the task at hand.

In embodiments, the report generator 128 organizes the collected information in a manner most conducive to resolving the service request. For example, when a user contacts the chat manager 106 with a technical issue related to a malfunctioning device, the chat manager 106 gathers information about the device model, error messages, and attempted troubleshooting steps. The report generator 128 arranges the collect information in a logical and sequential manner, starting with the customer's initial description of the problem, followed by a breakdown of the device details, error messages, and the steps taken for troubleshooting. The report might also include a summary or checklist of potential solutions based on the gathered data. In another example, the user may inquire about different product options and pricing. The report generator 128 categorizes the collected data into sections, e.g., product specifications, pricing details, and any additional services or discounts, based on the customer's questions. Visual aids like product images or comparison charts may be included to enhance the presentation. In some embodiments, the collected information is organized based on how the human agent is expected to use the information. In embodiments, the report generator 128 accesses the data repository 108 to consult a profile of the human agent receiving the report. In some embodiments, the report generator 128 uses the profile of the human agent to organize the collected information based on how the human agent previously resolved a similar service request. In embodiments where the human agent receiving the chat conversation has no experience handling similar service requests, the collected data is organized based on how other human agents resolved similar service requests.

In embodiments, machine learning models are used to compare human agents with similar experience or knowledge and provide the collected data to the human agent in a manner that would be most beneficial for human agents of similar experience or knowledge in resolving the service request. For example, when the report generator 128 determines that the human agent receiving the chat conversation is highly experienced in technical support, the collected information is organized to provide an in-depth technical breakdown of the problem, including detail logs, error codes, and advanced troubleshooting steps. The report may highlight recent advancements or updates in the software that could be relevant and assumes that the agent is well-versed in the intricacies of the software and can handle a more technical discussion. In contrast, when a novice sales agent is handling a sales inquiry chat conversation, the report generator 128 consults the agent's profile and notes the agent's limited experience in sales. The collected information is organized in a simplified and structured manner, including product summaries, pricing highlights, and answers to frequently asked questions. The report may provide a scripted conversation flow, guiding the agent on how to address common customer queries and objections, assuming the agent benefits from a more structured approach due to limited sales experience.

In one or more embodiments, when generating a report, the report generator 128 takes into consideration the setup of the system of the human agent and/or a behavior of the human agent. Not all human agents handle similar service requests in a similar manner. For example, a first human agent may look at resources related data, e.g., CPU and RAM usage, error logs, and system diagnostics, first when attempting to resolve an issue, while a second human agent may look at software related data, e.g., software upgrades, software version information, release notes, and upgrade paths, first when attempting to resolve the issue. Both methods result in resolution of the service request, however, a report customized for the first human agent and their method of resolving the issue may not enhance or organize the information in a way that is suited for the second human agent and their method of resolving the issue.

In embodiments, the report generator 128 holds back or omits superfluous or unnecessary information in the report to the human agent. For example, an experienced technical support specialist agent tends to focus on technical details and prefers concise information while a general customer support agent prefers comprehensive information. The report generator 128 omits superfluous product information, user manuals, and general FAQs and provides the experienced technical support specialist agent with a concise summary focusing on technical logs, error messages, and known technical issues. In contrast, the report generator 128 includes a broader range of information, such as product specifications, user guides, and a detailed account of the customer's inquiry. By providing customized reports to the human agent, the speed and efficiency with which the human agent may be brought up to speed on a service request and, ultimately resolve the service request, is significantly increased.

In one or more embodiments, when a chat conversation is being transferred to a human agent with minimal or no experience or knowledge resolving a service request involving a particular topic, the report generator 126 includes in the report provided to the human agent an overview or background of the topic and other relevant information for resolving issues related to the topic. For example, when a chat conversation is transferred to a human agent with minimal experience handling technical issues related to a specific hardware product, the report generator 128 includes an extensive background section that provides an overview of the software product, its key features, common technical issues, and basic troubleshooting steps. The report may include links to relevant product documentation and training resources. The report may include a link to chat conversations with another user that solved a similar issue. In embodiments, the report generator 128 tailors the background and relevant information provided in the report to the experience and knowledge of the human agent. A human agent well versed in a particular topic may receive a report with less background or the background omitted, and little, if any, additional information. In some embodiments, the report generator includes words of encouragement to the human agent and/or helpful hints for resolving the service request. Words of encouragement may include, "You've got this!" or "Don't hesitate to ask for help if needed".

In one or more embodiments, the report generated by the report generator 128 is used to select the best human agent to which the chat conversation is to be transferred. In embodiments, the chat manager 106 determines the best human agent by analyzing the human agent profiles of the human agents that are available and ranking the human agents based on experience, overall success rate, success rate when handling similar services requests, length of time since handling a similar request, familiarity with the user, or any other factor, or a combination of factors. In some embodiments, the chat manager 106 uses machine learning models to determine a weighting for the various factors that are used to automatically select the best human agent for handling the service request. In embodiments, the best human agent is selected using real-time, updated information. In embodiments, the best human agent for handling a particular service request at a first instance in time may not be the same human agent that would be best for handling the same service request at a later second instance in time. For example, the original best human agent for handling the service request may be unavailable, or in the intervening time, the success rate or one or more other factors of the human agents may have changed, thereby changing the order of the ranking. In other embodiments, a change in the best human agent is a result of a change to the weights applied to the factors for selecting the human agent as determined by a machine learning model.

In one or more embodiments, the report generator 128 provides information in the report related to the experience and/or knowledge of the user. More particularly, in some embodiments, the information provided in the report includes guidance for the human agent based on the experience and/or knowledge of the user. For example, when a user acknowledges and/or the chat manager 106 otherwise determines that the user has minimal experience and/or knowledge of a topic or solution for the service request, the report to the human agent receiving the chat conversation may include guidance intended to be understood by a novice, i.e., written for a third grader. In embodiments, the user experience and knowledge, along with all other potential useful information about the user is stored in a user profile 152 in the data repository 108. In embodiments, the user profiles 152 are updated in real-time such that the components generating the report use up-to-date information.

In one or more embodiments, the report generator 128 generates a report for use by management. In embodiments, the report generator 128 uses machine learning models to analyze the chat conversations and generates a report that includes guidance for training agents, guidance regarding where service requests are being solved and where service requests are not being solved, and guidance for hiring human agents. For example, the report generator 128 includes in a report to management the top n. e.g., 1, 3, 10, 20, issue(s) or topics being addressed in service requests to the chat manager 106 over a given time period. In embodiments, the report to management includes the number of times each issue or topic is presented, the success rate for resolving the issue, the identity of the human agents that were successful in resolving the issue, the identity of the human agents that were unable to resolve the issue, and/or the level of expertise required to resolve the issue. In some embodiments, the report generator 128 identifies trends in the service requests received and provides hiring and scheduling guidance for addressing the trends. For example, the report generator 128 uses machine learning models to analyze the chat conversations to determine patterns in types of service request, i.e., times of the day and the days of the week and identify the number of human agents and their minimum level of knowledge or experience required to resolve the service requests during particular times during the day and particular days of the week.

In one or more embodiments, the report generator 128 generates a report for use by technical services teams. In embodiments, the report generator 128 uses machine learning models to analyze the types of service requests and their resolutions and generates a report to technical services teams identifies where changes can be made to programs, processes or procedures to reduce the number of service requests related to the identified issues. For example, a software company's technical team receives numerous service requests related to software bugs reported by customers. The report generator 128 identifies common patterns in the software bug reports, such as recurring error messages or user actions triggering issues, and analyzes how these issues were resolved. Based on the analysis, the report suggests specific improvements, such as code fixes, better error handling, or user interface enhancements. The report also highlights areas where additional user guidance or documentation could reduce confusion. The technical services team uses the report to prioritize software improvements, reducing the frequency of bug-related service requests and enhancing the overall user experience. In another example, a hardware manufacturer's technical services team deals with service requests from customers struggling with product setup and onboarding. The report generator 128 analyzes chat conversations related to onboarding and setup, identifying common pain points, frequently asked questions, and user difficulties. The report suggests revising setup guides, developing video tutorials, or enhancing the user interface to address identified issues. The report generator 128 also highlights areas where additional agent training may be beneficial. The technical service team implements the recommendations, resulting in smoother product onboarding, fewer service requests, and increased customer satisfaction. In another example, an IT services company's technical support team handles a wide range of service requests, including network issues, hardware problems, and software errors. The report generator 128 categorizes service requests by type and analyzes the resolution approaches used by technical agents. It identifies bottlenecks, recurring problems, or lengthy resolution times. The report suggests streamlining troubleshooting guides, automating common diagnostics, or offering remote support tools for certain issues. It also recommends training or certification programs for agents. The technical services team implements process improvements and training initiatives, leading to faster issue resolution, reduced service request volumes, and increased efficiency.

In one or more embodiments, the natural language processor 130 of the chat manager 106 is a technology or system that enables the chat manager 106 to understand, interpret, and process input from the user device 102 in a way that is similar to humans. In embodiments, natural language processing involves the application of computational techniques and algorithms to analyze and extract meaning from natural language text or speech. In embodiments, the natural language processor 130 includes a sentiment analyzer 134, various parsers 136, various labelers 138, a morphological processor 140, a word embedder 142, and a machine translator 144.

In one or more embodiments, the sentiment analyzer 134 of the natural language processor 130, also referred to as opinion miner, determines the sentiment or subjective information expressed in a piece of text. In some embodiments, sentiment analysis includes analyzing and classifying the underlying sentiment as positive, negative, or neutral. In embodiments, the goal of sentiment analysis is to extract insights from text data by understanding the sentiment or opinion expressed by individuals or groups.

In one or more embodiments, the sentiment analyzer 134 uses various techniques, including lexicon-based analysis, machine learning approaches, deep learning and neural networks, and rule-based approaches to analyze sentiment of dialogue. Lexicon-based sentiment analysis may include using pre-defined dictionaries or lexicons of words or phrases with assigned sentiment scores. Each word or phrase is associated with a sentiment polarity, such as positive, negative, or neutral. The chat manger scans the user input for words present in the lexicon and calculates an overall sentiment score based on the sentiment values of those words. The sentiment score can indicate the overall positive, negative, or neutral sentiment of the input.

In some embodiments, machine learning algorithms are trained to classify the sentiment of a given text. In one embodiment, the machine learning algorithm is Naive Bayes. In embodiments, supervised learning techniques involve training a model on labeled data where each input is annotated with the corresponding sentiment. The model may learn patterns and features from the training data and predicts the sentiment of unseen text. The chat manager can use such a trained model to classify user inputs and determine the sentiment.

In one or more embodiments, deep learning techniques, including recurrent neural networks (RNNs) or transformers, are employed for sentiment analysis. These models capture the contextual information and semantic meaning of text. The models are trained on large labeled datasets to learn the sentiment patterns and, using the learned sentiment patterns, classify the sentiment of user inputs.

In one or more embodiments, rule-based sentiment analysis includes defining specific rules or patterns that indicate sentiment in text. The rules are based on linguistic features, grammatical structures, or known sentiment triggers. The sentiment analyzer applies these rules to analyze the user input and determines the sentiment based on the presence or absence of specific patterns.

One or more embodiments use machine learning algorithms, such as naive bayes, support vector machines (SVM), or Neural Networks, trained on labeled datasets. These algorithms learn patterns from the labeled data and create models to classify text into positive, negative, or neutral sentiment categories. The trained model is applied to new, unseen text data to predict the sentiment. The model assigns a sentiment label to each text instance based on its learned patterns and features.

In one or more embodiments, sentiment analysis measures polarity, emotion, intensity, subjectivity, and opinion targets. Polarity refers to whether the sentiment expressed is positive, negative, or neutral. Sentiment analysis assigns a numerical value or a label to indicate the sentiment polarity. Sentiment analysis may identify specific emotions conveyed in the text, including joy, anger, sadness, fear, surprise, disgust, and anticipation. Sentiment analysis may assess the intensity or strength of the sentiment expressed in the text, indicating whether the sentiment is strongly positive or negative, or if the sentiment is more moderate or weak. Sentiment analysis can also determine the degree of subjectivity in the text, i.e., the extent to which the text expresses opinions, beliefs, or personal viewpoints rather than objective facts. In some embodiments, sentiment analysis identifies the specific targets or entities that the sentiment refers to. For example, sentiment analysis may identify whether the sentiment is about a product, a service, a person, or a brand.

In one or more embodiments, different sentiment can be detected for different pieces of text within a single message or within a single chat conversation comprising multiple messages, and the subset of text having that sentiment can be color-coded, flagged, labeled, or graphically indicated with an icon or otherwise. Identifying the different sentiments in this manner allows the human agent to easily visually see (a) the sentiment, and (b) the topic, question, problem, or issue to which the portion of text relates. This may include a sub-topic(s), a sub-question(s), or a sub-issue (s) from the overall conversation with the chat manager 106. The sentiment and topic might be represented by different modes of graphical indication so the human agent can easily visually topics on the chat conversation and sentiment changes in the chat conversation.

In one or more embodiments, when the sentiment analyzer 134 determines the user sentiment is positive, the chat manager 106 generates responses that include positive reinforcement, acknowledgment, or appreciation. In embodiments, when the sentiment analyzer 134 determines the user sentiment is negative, the chat manager 106 generates response that include empathy, apology if necessary, and offers solutions to address the concerns of the user. In some embodiments, when the sentiment analyzer 134 determines the user sentiment is neutral or ambiguous, the chat manager 106 asks for clarification or provides general information to guide the conversation. In embodiments, when the sentiment analyzer 134 determines that the user is agitated or emotional, the chat manager 106 uses calming language or suggests taking a break before continuing the chat conversation.

In one or more embodiments, the sentiment analyzer 134 may determine that a response generated by the chat manager 106 elicited an unexpected user sentiment. For example, the response generated by the chat manager 106 may have been a good first step, but did not resolve the issue, or the user does not possess the expertise or knowledge or time to figure out the response, or the response was the correct response, and the user did not like the response, i.e., an inquiry from a user regarding a return policy in which the period for returning an item has lapsed. When the user sentiment determined by the sentiment analyzer 134 does not match the expected user sentiment, the dialogue in the chat conversation is flagged for further analysis.

In one or more embodiments, sentiment analysis collected during a chat conversation is later compared to user provided feedback collected during the chat conversation. The feedback may then be used for further training and fine-tuning the machine learning models.

In one or more embodiments, the natural language processor 130 uses various parsers 136 to analyze and understand the structure of sentences. In embodiments, the various parsers 136 include constituency parsers, dependency parsers, transition-based parsers, and chart parsers. Constituency parsers, also known as phrase structure parsers, analyze the grammatical structure of sentences by identifying constituents or phrases and their hierarchical relationships. Dependency parsers analyze the syntactic relationships between words in a sentence by identifying the dependencies or links between words. Transition-based parsers are a type of dependency parser that uses a set of transition actions to build the dependency tree incrementally. Chart parsers use dynamic programming techniques to efficiently explore and analyze all possible parse tree structures for a given sentence.

One or more embodiments include probabilistic context-free grammar (PCFG) parsers, lexical functional grammar (LFG) parsers, head-driven phrase structure grammar (HPSG) parsers, link grammar parsers, and semantic dependency parsers. In embodiments, the choice of parser depends on the specific linguistic formalism, the task at hand, the availability of resources, and the characteristics of the language being processed. Each parser has its own strengths and weaknesses and is designed to capture different aspects of sentence structure and meaning.

In one or more embodiments, the natural language processor 130 uses various labelers 138 to assigns labels or tags to linguistic elements in text data. In embodiments, labeling assists in categorizing and annotating various aspects of text to enable further analysis and understanding. In some embodiments, the various labelers 138 include part-of-speech (POS) labeler, named entity recognizer (NER), semantic role labeler (SRL), sentiment labeler, and topic labeler.

In embodiments, the POS labeler, also known as a POS tagger, assigns grammatical tags or labels to each word in a sentence based on its syntactic role. In some embodiments, POS labels include categories like noun, verb, adjective, adverb, pronoun, preposition, conjunction, and more. In embodiments, POS labeling is crucial for syntactic analysis, language modeling, and other NLP tasks. In some embodiments, the NER identifies, and labels named entities in text, such as names of people, names of organizations, location names, dates, and other named entities of interest. In embodiments, the NER assists in information extraction, entity linking, and question answering. In embodiments, the SRL assigns labels to words in a sentence to indicate their semantic roles or relationships within a sentence structure. In embodiments, semantic roles include agent, patient, theme, location, time, and others. In some embodiments, the SRL assists in understanding the roles played by different entities and arguments in a sentence. In embodiments, a sentiment labeler assigns sentiment labels or polarity (positive, negative, neutral) to text based on the expressed sentiment or opinion. In some embodiments, sentiment labeling is used in sentiment analysis tasks to classify the sentiment expressed in reviews, social media posts, customer feedback, and other text data. In embodiments, a topic labeler categorizes text documents or passages into pre-defined topic categories or themes. In some embodiments, the topic labeler assigns labels or tags to indicate the main subject or topic discussed in the text. Topic labeling is useful for organizing and clustering text data, content recommendation, and topic modeling.

In one or more embodiments, labeled data generated by the various labelers 146 is used for training machine learning models, building language resources, and enabling higher-level analysis and understanding of text data.

In one or more embodiments, the morphological processor 140 of the natural language processor 130 applies linguistic rules and algorithms to reduce words to their base or root forms using lemmatization and stemming. In some embodiments, lemmatization converts words to their base or dictionary form, known as the lemma. In some embodiments, lemmatization considers the part of speech (POS) of a word and applies rules specific to each POS tag to produce the lemma. For example, the lemma of the word "running" would be "run". Lemmatization ensures that different inflected forms of a word are represented by a single base form, facilitating tasks like text normalization and vocabulary reduction. In some embodiments, stemming includes removing affixes from words to obtain their root or stem form. Stemming algorithms apply heuristics and pattern-matching rules to identify and remove common suffixes and prefixes. For example, the stem of "running" would be "run".

In one or more embodiments, the word embedder 142 of the natural language processor 130, also known as word embedding model or word representation model, is a technique or algorithm used to represent words as continuous vector representations in NLP. In embodiments, word embeddings capture semantic relationships and meanings of words based on their contextual usage in a large corpus of text. In some embodiments, word embeddings are used as input features for tasks like text classification, named entity recognition, machine translation, and sentiment analysis. In embodiments, word embedding models include Word2Vec. GloVe (Global Vectors for Word Representation), and Fast-Text, which use different algorithms and training approaches to learn word embeddings from large text corpora.

In one or more embodiments, the machine translator 144 of the natural language processor 130 automatically translates text from one language to another. In some embodiments, the machine translator 144 uses sequence-to-sequence modeling techniques and attention mechanisms techniques to capture the contextual and semantic information in the input text and generate the translated output.

In one or more embodiments, the generative model 132 of the chat manager 106 is a type of artificial intelligence model that utilizes deep learning techniques to generate human-like text based on the input the model receives, e.g., generative pre-trained transformer (GPT). In embodiments, the generative model is trained on large amounts of text data and is able to generate coherent and contextually relevant responses. In some embodiments, specific implementations and variations of the generative model differ depending on the model and the intended application.

In one or more embodiments, the generative model 132 includes several components that work together to generate coherent and contextually relevant text. In embodiments, the generative model 132 includes a tokenizer 146, a token embedder 148, and transformer architecture 150.

In one or more embodiments, the tokenizer 146 of the generative model 132 acts as a bridge between the raw input text and the numerical representations used by the generative model 132. In embodiments, the tokenizer 146 breaks down the text into tokens, maps them to indices, and prepares them for further processing by the generative model 132. In some embodiments, output of the tokenizer 146 is a sequence of tokens that serves as the input to the encoder layers of the generative model 132 for generating responses or generating the next tokens in a conversation.

In one or more embodiments, the tokenizer 146 operates to break down the input text into individual tokens, enabling the model to understand and process the text at a granular level. In embodiments, the tokenizer 146 takes a text string as input and segments the text string into discrete units called tokens. The tokens may represent words, subwords, or characters, depending on the specific tokenization strategy employed. For example, the sentence "How are you?" might be tokenized into ["How", "are", "you", "?"]. In some embodiments, the tokenizer 146 maps each token to a corresponding index or identifier from a predefined vocabulary. In embodiments, the vocabulary contains a list of unique tokens on which the model had been trained. By mapping tokens to their corresponding indices, the tokenizer 146 establishes a consistent representation for the input text.

In one or more embodiments, the tokenizer 146 introduces special tokens into the tokenized sequence to provide additional information or context. The special tokens may include markers for the beginning and end of a conversation, system prompts, user prompts, or other relevant markers. In some embodiments, the tokenizer employs subword tokenization to handle out-of-vocabulary (OOV) words or to capture more fine-grained representations of words. In embodiments, subword tokenization splits words into smaller units called subwords or subword tokens, allowing the generative model 132 to handle unseen or rare words more effectively. Subword tokenization techniques are particularly useful when dealing with languages with complex morphology or in scenarios with limited training data. In embodiments, the tokenizer 146 handles special characters, such as punctuation marks or emoticons appropriately based on a specific configuration of the tokenizer 146. In some embodiments, the tokenizer 146 ensures that special characters are tokenized correctly and do not interfere with the model's understanding of the input.

In one or more embodiments, the token embedder 148 of the generative model 132 converts individual tokens into meaningful vector representations called token embeddings. In some embodiments, embeddings capture the semantic and syntactic properties of the tokens, allowing the model to understand and process the input text effectively. In embodiments, the token embedder 148 takes the tokens generated by the tokenizer as input and maps each token to a dense vector representation. In some embodiments, each token is associated with a unique embedding vector that captures its semantic and syntactic characteristics. In embodiments, token embedding converts discrete tokens into continuous representations. Rather than representing words or tokens as discrete symbols, the embeddings position the words or tokens in a high-dimensional vector space, where proximity between embeddings reflects their semantic relationships. This enables the model to perform computations and calculations on the token embeddings.

In one or more embodiments, token embeddings aim to capture both semantic and syntactic information. In some embodiments, token embeddings are learned during a training process, where the model adjusts the embeddings based on the patterns and relationships observed in the training data. In embodiments, the embeddings reflect the meaning and context of the tokens in a way that helps the model generate meaningful and coherent responses. In some embodiments, the token embeddings are contextual, i.e., account for context of the tokens within the input sequence. In some embodiments, the embedding of a particular token depends not only on the token itself but also on the surrounding tokens and the overall input context. This allows the generative model 132 to capture the contextual information necessary for generating contextually appropriate responses.

In one or more embodiments, token embeddings serve as an initial input to the transformer architecture 150 of the generative model 132. In some embodiments, token embeddings provide a numerical representation of the tokens that the generative model 132 understands and can process. In embodiments, the token embeddings, along with other components of the generative model 132 such as the self-attention mechanism and feed-forward layers, enable the model to generate coherent and contextually relevant responses based on the input tokens.

In one or more embodiments, the transformer architecture 150 of the generative model 132 captures contextual information in an input sequence and generates coherent and contextually relevant responses. In some embodiments, the transformer architecture 150 relies on a self-attention mechanism to capture dependencies between different words in a sentence. Unlike traditional recurrent neural networks (RNNs), which process words sequentially, the self-attention mechanism allows the generative model 132 to attend to all words simultaneously. In embodiments, the self-attention mechanism calculates attention weights for each word in the input based on its relationship with all other words. This enables the generative model 132 to understand the importance and relevance of each word in the context of the entire sentence.

In one or more embodiments, the transformer architecture 150 includes an encoder and a decoder. In embodiments, the encoder processes the input sequence, typically consisting of tokens, and captures contextual information of the input sequence using self-attention. In some embodiments, the decoder generates the output sequence based on the encoded input and previously generated tokens, also utilizing self-attention and attention over the encoded input. In embodiments, self-attention is performed multiple times in parallel with different learned weight matrices, known as attention heads, to capture different types of relationships and dependencies between words. In some embodiments, the outputs of the attention heads are concatenated and linearly transformed to produce the final attention output.

In one or more embodiments, the transformer architecture 150 employs feed-forward neural networks within each encoder and decoder layer. In some embodiments, the feed-forward neural networks apply non-linear transformations to the attention outputs, further capturing complex patterns and interactions within the input sequence.

In one or more embodiments, positional encoding is added to the input sequence to convey the relative positions of the tokens. In embodiments, positional encoding provides the model with information about the order of the words, allowing the model to understand the sequential nature of the input. In some embodiments, layer normalization is applied after each sub-layer (self-attention and feed-forward network) in both the encoder and the decoder. In embodiments, layer normalization normalizes the outputs of each layer, ensuring stable training and better generalization.

In one or more embodiments, during training of the generative model 132, parameters of the transformer architecture 150, including the attention weights and feed-forward network weights, are optimized using methods such as backpropagation and gradient descent to minimize the difference between predicted outputs and true outputs in the training data. In some embodiments, during inference or testing, the generative model 132 generates an output sequence autoregressively, predicting one token at a time based on the previously generated tokens.

In one or more embodiments, the data repository 108 is any type of storage unit and/or device (e.g., a file system, database, collection of tables, or any other storage mechanism) for storing data. Further, a data repository 108 may include multiple different storage units and/or devices. The multiple different storage units and/or devices may or may not be of the same type or located at the same physical site. Further, the data repository 108 may be implemented or executed on the same computing system as the chat manager 106 and/or human agent device 104. Alternatively, or in addition, a data repository 108 may be implemented or executed on a computing system separate from the chat manager 106 and/or the human agent device 104. The data repository 108 may be communicatively coupled to the chat manager 106 and/or human agent device 104 via a direct connection or via a network.

Information describing user profiles 152, human agent profiles 154, a knowledge base 156, algorithms 158, training data 160, reports 162, conversation patterns 164, transfer criteria 166, sentiment pathways 168, and intents 170 may be implemented across any of components within the system 100. However, this information is illustrated within the data repository 108 for purposes of clarity and explanation.

In some embodiments, the data repository 108 includes user profiles 152 for individuals that have conversed with or are actively conversing with the chat manager 106. In one or more embodiments, the user profiles 152 includes profiles of potential users, e.g., customers, members, subscribers, clients, patients, employees, family members of a business, an organization, an industry or other entities for which the chat manager 106 is intended to provide support.

In one or more embodiments, the user profiles 152 provide information relating to the individual that the chat manager 106 and human user rely on during a chat conversation with the user to better understand, relate to, and/or address the needs of the user. Because the chat manager 106 may be used in a wide range of service types and industries, and have varying levels of complexity, the information collected within the user profiles 152 may differ greatly between chat management systems. In embodiments, user information includes professional information, personal information, a history of engagements with the chat manager 106, and combinations thereof.

In one or more embodiments, employer information includes an employer name, position held by the user in the business or company, business contact information of the user, experience or expertise of the user, former employers, education, coworkers, former coworkers, professional affiliations, reading level, and certificates obtained by the user. In some embodiments, the business information is provided by the user or extracted from one or more chat conversations with the user. In some embodiments, the business information is provided by the employer. In some embodiments, the business information is extracted from material found in business directories, social media, and other resources available to the chat manager 106 locally, on the internet, and elsewhere.

In one or more embodiments, personal information includes home contact information of the user, the user's hobbies, race, religion, ethnicity, marital status, political affiliations, associations, stances on social issues, country of birth, nationality, subjectivity, bias, and temperament, family members of the user, and locations lived in or visited by the user. In some embodiments, this information is provided during the course of the conversation, either in response to queries from the chat manager 106, or voluntarily during the back and forth of the chat conversation. In some embodiments, machine learning models are able to make inferences based on user comments. In some embodiments, machine learning models comb the internet, and other accessible resources, including social media, for relevant information about the user.

In one or more embodiments, the user history is compiled by the chat manager 106 during a chat conversation and during subsequent review and analysis of the chat conversation. In some embodiments, during and/or subsequent to completion of a chat conversation with a chat manager 106, one or more trained models are applied to the chat conversations with the user to analyze the chat conversation. The results of the review and analysis are appended to the text of the chat conversation, along with any user comments, agent comments, or post-processing comments and added or mapped to the user profile. In some embodiments, the addition of the new chat conversation triggers a review and analysis of the previous chat conversations of the user.

In one or more embodiments, user history includes a list of occasions when the user previously conversed with the chat manager 106. In some embodiments, the list includes a summary of the conversation, including any issues presented, whether the issue was resolved, and steps taken in the attempt to resolve the issue, regardless of whether the steps were successful. In embodiments, the user history may also include any comments or feedback from the user, from the human agent, or provided in response to review and analysis of the chat conversation. In some embodiments, a user profile is mapped to a dialogue of previous chat conversations of the user. As noted above, the dialogue includes the messages exchanged between the user and chat manager 106 and the human agent, timestamps, and metadata associated with each chat conversation. In some embodiments, the user history includes any sentiment analysis performed during or subsequent to any or all of the previous chat conversations. In embodiments, the user history includes any reports generated, patterns identified, or other insights gathered with regards to the user and the chat conversation with the user.

In one or more embodiments, user history includes previous purchases by the user, e.g., goods or services. In some embodiments, the purchases by the user are limited to a specific time period. In some embodiments, services include current, previous, and/or future subscriptions.

In one or more embodiments, when a user has no user history, i.e., this is their first interaction with the chat manager 106, a default or baseline level may be assigned by the chat manager 106 for any or all of the user attributes. For example, all new or unknown users to the chat manager 106 are presumed to have a limited education level or a limited reading level until the user identifies otherwise, or machine learning models are applied to the conversations and determine otherwise. Depending on the determined demographics of the individuals that have used or are expected to use the chat manager 106, the education and reading levels for the generated responses for new users may be adjusted. In some embodiments, where new users of the chat manager 106 historically include an average education or reading level, responses are generated to be understood by a high school graduate. In embodiments, the education or reading levels of the responses are adjustable, up or down, based on analysis of the chat conversation as the chat conversation progresses. In some embodiments, analysis is performed by the chat manager 106 using machine learning models, however, a human agent may also be able to adjust the perceived education or reading level of the user to increase the effectiveness and efficiency in resolving a service request during a current chat conversation with the user. In one or more embodiments, adjustments to the education and/or reading level of a user are made in real-time. When there is a significant difference between what the chat manager 106 would expect as a level of comprehension of a user and a determined level of comprehension of the user, the chat manager 106 may inquire into the disparity with the user during the chat conversation. In embodiments, any responses to any inquiry to the user for further information is added to the user profile and may be used to fine tune the machine learning models.

In one or more embodiments, the user profiles 152 include a record of the awareness or familiarity of a user with certain topics. In embodiments, rather than assuming that the user has a familiarity with a topic because the topic has been addressed during multiple previous chat conversation, machine learning models may be used to analyze the conversations and determine the familiarity of the user with the topic. In this manner, the user profiles 152 include actual or apparent familiarity with a topic instead of their perceived familiarity. In embodiments, the chat manager 106 generates responses that account for the user's actual or apparent familiarity with the topic as opposed to their perceived familiarity. A user simply being exposed to a topic repeatedly does not necessarily warrant any less of an explanation or detail when referencing the topic during a subsequent conversation. In one or more embodiments, when analysis of the conversation by machine learning models indicates a growth in the user's knowledge about the topic, the user profile is updated to reflect the increased knowledge or awareness and future response are adjusted based on the user's familiarity.

In one or more embodiments, a user profile is created when a chat conversation is initiated. In other embodiments, a user profile for a potential user is created when the potential user becomes a potential user. For example, when a company or organization first engages the services of chat manager 106, a user profile is created for each of the employees, partners, affiliates, independent contractors, domestic partners, counsel, advisors, customers, and/or members of that company or organization that may avail themselves of the services of the chat manager 106. Employee directories, membership rosters, client lists, and patient records, may be used to create user profiles 152. In one or more embodiments, creating a user profile may be a requirement for initiating a chat conversation with the chat manager 106.

In one or more embodiments, each user profile includes information identifying the user, e.g., a unique identifier, such as a user ID or username. The user profile may include user preferences, such as language preferences, notification settings, or customization choices. By storing and utilizing user preferences, the chat manager 106 is able to personalize the chat conversation.

In some embodiments, the human agent profiles 154 include identification and contact details, skills and expertise, hobbies, availability and schedule, language proficiency, performance metrics, training and certifications, and notes and annotations of the human agents. In one or more embodiments, the human agent profiles 154 include demographic information of the human agents, including race, religion, ethnicity, country of birth, marital status, number of children, if any, and locations lived in. The personal information may also include political ideology and social stances. Although the chatbot is configured to avoid discussion of sensitive or controversial issues such as race and politics during a conversation, over the course of the conversation, the user may indicate various personal characteristics for the word choice, grammar, syntax. In some embodiments, the chatbot infers demographics and personal characteristics of the user from the user's text. For example, when the user makes reference to eating kosher or halal, or the use of grammar or syntax particular to a region or culture.

By connecting a user with a human agent with similar background or beliefs to the user may help the user feel more related to or understood. While ancillary to the issue for which the service request is initiated, relatability between the human agent and the user may improve the overall quality of the conversation, and in some instances lead to a quicker resolution.

The human agent profile may include the name of the agent, an employee ID, contact information (such as email address or phone number), and any other unique identifiers to identify the agent within the organization. The human agent profile may detail the skills, areas of expertise, and knowledge domains of the agent. The human agent profile may include a list of tasks handled by the human agent, how recently the tasks were handled, whether the task was resolved or not, and how the task was handled. The information in the human agent profile may assist in routing service requests to the appropriate agent who can provide the most accurate and relevant assistance. The human agent profile information may also be used when generating a report prior to transferring a chat conversation from a chat manager 106 to the human agent.

The human agent profiles 154 may include the availability of the agent and working hours, including shift timings or specific days off. This information allows for managing the allocation of user queries and ensuring adequate coverage for service requests of various types. Any language proficiency of the human agent is included in the human agent profile. The profile might contain information about the performance metrics of the agent, such as average response time, customer satisfaction ratings, or resolution rates. This data allows supervisors to monitor and evaluate the performance of the agent and provide appropriate feedback, including recognition and acknowledgment, and training, if necessary. Details of training programs completed, certifications earned, or qualifications may also be included in the human agent profile, and assist in assessing the expertise of the human agent and ensuring necessary skills to handle user queries effectively.

In one or more embodiments, the human agent profiles 154 include notes and annotations about strengths, weaknesses, preferences, or any other relevant information about the human agent that may assist in providing better support to users. For instance, the human agent profile may indicate that the human agent has no experience dealing with DNS issues or is not familiar with DNS issues. As a result, when the human agent having no experience nor familiarity with DNS issues is selected to handle a service request dealing with a DNS issue, a report generated by, for example, the report generator 128 of the chat manger 106 to the human agent may include a background and an explanation of DNS and information regarding prior DNS issues. In some embodiments, the chat manager 106 adjusts the technical level and length of background and the explanation provided in the report to the human agent depending on the experience and knowledge indicated for the human agent in their human agent profile.

In one or more embodiments, the knowledge base 156 available for reference by the generative models may vary depending on the service type, organization, and industry. The knowledge base for training the chatbot for technical support may include product documentation, frequently asked questions (FAQs) and troubleshooting guides, knowledge articles, community forums and support tickets, bug reports and knowledge base updates, and internal support resources. The knowledge base available for a chatbot configured to handle product and service inquiries may include product descriptions, FAQs and support documentation, product catalogs and brochures, company policies and procedures customer reviews and feedback, and sales and marketing materials. The knowledge base available for a chatbot configured for medical assistance may contain relevant medical information, guidelines, and best practices including medical literature and research, medical databases and references, medical terminology and definitions, symptoms and diagnoses, treatment guidelines and recommendations, drug information, preventive care and health tips.

In one or more embodiments, product documentation includes product manuals, user guides, specifications, installation instructions, and other documentation relevant to the supported products. FAQs and troubleshooting guides provide answers to common queries and issues that customers may encounter. Organizations often create knowledge articles or articles that address common technical issues or provide step-by-step instructions for solving problems. These articles may cover various topics, such as software configurations, hardware setup, troubleshooting steps, or best practices. Community forums or support ticket systems, where customers ask questions and receive answers from technical experts or customer support agents, provide valuable material for training the generative model 132. The interactions on these forums may be used as training data to capture patterns and language use in addressing technical support queries. Bug reports, customer feedback, and updates to the knowledge base may provide valuable insights into common issues and resolutions for common issues. Internal resources such as internal wikis, documentation, or internal training materials may also be leveraged to train the chat manager 106. These resources may contain technical information, troubleshooting steps, or specific guidelines used by internal support teams.

In some embodiments, product descriptions include detailed descriptions of an organization's products or services, including features, specifications, pricing, and available options. Frequently Asked Questions (FAQs) and support documentation provide answers to common inquiries and issues that customers may have about the products or services. Some embodiments include product catalogs and brochures that provide additional information about the organization's offerings. Knowledge about company policies, return/exchange procedures, warranty information, or any other relevant policies can help the model address inquiries related to these aspects. Analyzing customer reviews and feedback provides insights into common concerns or issues raised by customers. Customer reviews and feedback may be available to the generative model 132 to help the model generate responses that address those concerns effectively. Sales and marketing materials, such as product brochures, promotional materials, or advertising campaigns, provide additional context and information about the products or services offered by the organization. In embodiments, sales and marketing materials assist the model understand the products from a marketing perspective and deliver more informed responses.

In one or more embodiments, scientific articles, medical journals, research papers, and clinical guidelines provide authoritative information about diseases, conditions, treatments, and medical procedures available to the generative model 132. Utilizing established medical databases, such as PubMed or other reputable sources, provides a wealth of information on various medical topics. The databases contain studies, case reports, clinical trials, and other medical references available to the generative model 132. A comprehensive list of medical terms, their definitions, and explanations assist the models in understanding and generating accurate responses using appropriate medical terminology. Information on common symptoms, the possible causes of the symptoms, and corresponding diagnoses assist the generative model 132 to provide initial insights into potential conditions based on reported symptoms. Guidelines and recommendations from medical associations and institutions may be used to train the model on appropriate treatment options, dosages, and precautions for specific conditions. Details about medications, including indications, contraindications, side effects, and dosage instructions may assist the generative model 132 in providing guidance and answers related to specific drugs. Advice on preventive care, health maintenance, healthy lifestyle habits, and general wellness may be included in the knowledge database to provide holistic guidance to users.

In one or more embodiments, the knowledge base 156 is reviewed for material that may be considered controversial, inflammatory, or otherwise elicit a negative response. Content that includes providing legal or medical advice may be filtered out or flagged. In one or more embodiments, when a generated response is determined by the chat manager 106 to be the correct response and the response includes flagged material, the chat manager 106 may alert the human agent for further action.

In one or more embodiments, the algorithm 158 is a machine learning algorithm that can be iterated to learn a target model f that best maps a set of input variables to an output variable, using a set of training data 160. The training data includes datasets and associated labels. In embodiments, the datasets are associated with input variables for the target model f. The associated labels are associated with the output variable of the target model f. The training data 160 may be updated based on, for example, feedback on the accuracy of the current target model f. Updated training data is fed back into the machine learning algorithm, which in turn updates the target model f.

In one or more embodiments, the algorithm 158 generates a target model f such that the target model f best fits the datasets of training data 160 to the labels of the training data 160. Additionally, or alternatively, the algorithm 158 generates a target model f such that when the target model f is applied to the datasets of the training data 160, a maximum number of results determined by the target model f matches the labels of the training data 160. In embodiments, different target models are generated based on different machine learning algorithms and/or different sets of training data 160.

In one or more embodiments, the algorithm 158 includes supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, in addition to the information found in the knowledge base 156 available for training the algorithms 158, the data repository 108 includes training data 160 for further training the models. In embodiments, the training data 160 includes pairs of user queries or messages and their corresponding expected responses. In embodiments, the training data 160 aims to capture various scenarios and interactions that may occur during a chat conversation. In some embodiments, the training data 160 is used to teach the chat manager 106 how to understand user inputs and generate appropriate and contextually relevant responses. For example, the input includes, "How do I reset my password?" and the output includes, "To reset your password, please visit our website and click on the 'Forgot Password' link. Follow the instructions provided to set a new password for your account."

In one or more embodiments, the training data 160 is created by human annotators who generate a diverse range of user inputs and corresponding responses. The dataset should cover various topics and scenarios that the chat manager 106 is expected to handle. Additionally, the training data 160 can be augmented with techniques such as data synthesis or dialogue simulation to increase its diversity and coverage.

In one or more embodiments, the training data 160 is collected from various sources, including historical chat logs, customer support transcripts, user surveys, or by employing human experts to simulate conversations. In embodiments, the training data is representative of the target user interactions and covers a wide range of potential inputs and responses.

In one or more embodiments, the training data 160 is used to train various machine learning models or algorithms. The models learn from the input-output pairs in the training data and generalize from the patterns and examples.

In one or more embodiments, the reports 162 generated by the report generator 128 include reports that are provided to the human agent to whom a chat conversation is transferred. The reports 162 provided to the human agents include all the information relevant to resolving the service request that was provided in the dialogue of the chat conversation. The information provided in the report to the human agent may also be extracted from the user profile. In embodiments, machine learning models are used to summarize the chat conversation and provides a summary as part of the report to the human agent. The reports to the human agent may include enhancements for supporting the human agent in achieving a resolution to the service request, e.g., one or more summaries of the chat conversation or portions of the chat conversation, and conversation metadata.

Conversation metadata refers to additional information or context about a conversation that is not directly part of the content exchanged between participants. Conversation metadata provides a layer of information that organizes the relevant information from the chat conversation and assists the human agent analyze and understand the chat conversation more effectively. The conversation metadata may include various elements such as flagged portions, labels for portions, flagged facts, statements of topics, sentiment analysis, time stamps, participant information, media attachments, structural elements, and contextual information. Flagged portions may include specific parts of the conversation that are marked or identified for special attention, often due to their significance, importance, or potential issues. Certain segments of the chat conversation may be labeled to categorize the segments based on content, intent, or any other relevant criteria. Flagged facts may include pieces of information within the chat conversation that are considered noteworthy or potentially important. Summaries may include brief descriptions or condensed versions of the chat conversation, providing an overview of its main points or highlights. Statements of the topic may include clear indications of what the conversation is about, helping to contextualize the content. Sentiment analysis include an assessment of the emotional tone or sentiment expressed within different parts of the conversation. Time stamps may include information about when each part of the conversation occurred. Participant information may include details about the individuals or entities involved in the conversation, such as usernames, roles, or identifiers. Media attachments may include information regarding any files, images, or other media shared during the conversation. Structural elements may include information about the organization or structure of the conversation, such as threads, replies, or levels of nesting. Contextual Information may include any relevant details about the environment or circumstances in which the conversation took place. The inclusion of conversation metadata may greatly enhance the understanding and usability of the conversation data, especially in contexts where automated processing, analysis, or retrieval of information is involved. The conversation metadata allows for more nuanced interpretation and utilization of the conversation content.

In one or more embodiments, when the one or more human agents that are monitoring a chat conversation are different from the human agent that ultimately receives the chat conversation for resolution, the report 162 includes comments provided by one or more human agents that were monitoring the chat conversation. By including the comments from the various human agents that monitored or assisted during the conversation, the human agent is able to more quickly catch up to speed on the situation.

In one or more embodiments, the reports 162 are organized or reorganized in a manner most conducive for the human agent to resolve the service request. In embodiments, the reports 162 are presented in a manner that takes into consideration the setup of the system of the human agent and/or a behavior of the human agent. By providing reports customized to the human agent, the speed and efficiency with which the human agent may be brought up to speed on a service request and, ultimately resolve the service request, is significantly increased.

In one or more embodiments, the reports 162 are prepared for use by management. In addition to providing analytics of human agent performance and details about the service request, the reports to management also provide hiring and scheduling guidance.

In one or more embodiments, the reports 162 are prepared for use by technical services teams. In embodiments, the reports 162 provide analysis of the types of service requests being received and their resolutions and identifies where changes can be made to programs, processes or procedures to reduce the number of service requests related to the identified issues.

In one or more embodiments, the conversation patterns 164 are predefined structures or templates used to organize and guide the flow of interactions between the chat manager 106t and the user. The conversation patterns 164 ensure that the chat manager 106 can handle user inputs effectively, provide appropriate responses, and maintain a coherent and engaging conversation. In one or more embodiments, the conversation patterns 164 are conversation patterns that the chat manager 106 is programmed to follow. Example conversation patterns 164 that the chat manager 106 is programmed to follow include, greetings—"Hello! How can I assist you today?"; confirmations—"Are you sure you want to proceed with this action?"; information retrieval—"Please provide your name and email address to continue."; multiple choice—"Would you like option A or option B?"; requests for details—"Could you please provide more information about your issue?"; error handling—"I'm sorry, I didn't understand your request. Can you rephrase it?"; follow-up questions—"You mentioned X. Can you tell me more about it?"; farewells—"Thank you for chatting with me. Have a great day!"; help and support—"If you need assistance, just type 'help' at any time."; and contextual continuation—"You mentioned earlier that you were interested in topic X."

In some embodiments, the conversation patterns 164 include negative conversation patterns, or conversation patterns that the chat manager 106 is programmed to avoid. This is often referred to as "defensive programming" or "defensive chatbot design." In embodiments, defensive programming prevents or heavily restricts the chat manager 106 from engaging in potentially harmful or undesirable interactions with users. In embodiments, by implementing defensive programming techniques, conversation patterns that may lead to negative outcomes, such as offensive language, inappropriate responses, or engaging in discussions on sensitive or harmful topics can proactively identify and block certain conversation patterns that may lead. For example, developers can create a blacklist of words, phrases, or topics that should be avoided. In embodiments, when a user input contains any blacklisted content, the chat manager 106 can respond with a predefined message or refuse to engage further in a chat conversation. Alternatively, the blacklisted content may trigger transfer to a human agent. However, caution must be applied when determining which words or phrases to instruct the chat manager 106 to avoid, as not all uses of words or phrases to be avoided may be negative. Completely avoiding responses including a particular company or organization may unnecessarily prevent a correct answer from being generated or output by the chat manager 106. For example, a blanket instruction to avoid generating responses that include any reference to a competitor or a competitor's products, may eliminate correct responses or responses necessary to best resolve a service request, e.g., not instructing the user to use Google's authentication app when using Google's authentication app is determined to be the best response to progressing the service request to resolution. In embodiments, to avoid unnecessarily restricting the ability of the chat manager 106 to generate a response that includes reference to a competitor, the conversation patterns 164 focus on the context of the use, i.e., avoiding negative comments about the competitor or placing blame on the competitor.

In one or more embodiments, confidence scores are used by the chat manager 106 to determine which response require human agent review prior to being output and which response can be output without human agent review. In some embodiments, confidence scores are determined by comparing the conversation pattern with known conversations patterns. When the conversation pattern for a response (a) matches or (b) is similar to conversations patterns that are identified as being safe, the confidence score will be higher. As the conversation pattern moves away from known or approved conversation patterns, the confidence score drops. Conversation patterns that do not match known or approved conversation patterns, or match or are similar to conversation patterns the chat manager 106 is programed to avoid, the confidence level falls or is low. In some instances, a response may receive a low confidence score because the conversation pattern could not be matched to an approved conversation pattern in the database of conversation patterns.

In one or more embodiments, the transfer criteria 166 for initiating a transfer of a chat conversation from the chat manager 106 to a human agent include detecting situations in which the chat manager 106 is no longer able to make progress in advancing the service request to resolution, or situations that are determined to require human intervention. In some embodiments, the transfer criteria 166 includes determining that the service request is overly complex or involves multiple topics. In embodiments, the transfer criteria 166 includes the inability of the chat manager 106 to determine the intent of the user, i.e., ambiguous language or context. In some embodiments, the transfer criteria 166 includes determining that the user is expressing strong emotions or is discussing sensitive topics. As described above, sentiment analysis may be used to determine the emotional state of the user. In some embodiments, the transfer criteria 166 includes determining that the overall sentiment of the user falls below or exceeds a threshold level or that the overall sentiment of the user remains below or exceeds a threshold level for a particular length of time or for a certain number of response.

In one or more embodiments, the transfer criteria 166 includes determining that the duration of the chat conversation exceeds a threshold duration or determining the number of unsuccessful attempts by the chat manager 106 to resolve the issue exceeds a threshold amount or determining that the number of messages output by the chat manager 106 exceeds a threshold amount. In some embodiments, the transfer criteria 166 include varying degrees. In embodiments, when the length of a chat conversation exceeds a first threshold, the chat manager 106 provides an indication to the human agent, and the human agent may transfer the chat conversation to themselves. When the length of the chat conversation exceeds a second, longer threshold, the chat manager 106 automatically initiates transfer of the chat conversation to a human agent 106. The human agent to whom the conversation is transferred may be the same human agent that was monitoring the chat conversation or a different human agent, based on their availability and/or their ability to resolve the service request.

In one or more embodiments, the transfer criteria 166 includes the user explicitly requesting to chat with a human agent or asks for live assistance. Similarly, when the user fails to appreciate that they are presently chatting with a non-human agent, the transfer criteria 166 may include a request by the user to chat with a manager or a supervisor. In some embodiments, the transfer criteria 166 includes detection of the user engagement with an interface element on the user interface 110 of the user device 102 requesting transfer to a human agent or requesting to escalate the chat conversation.

In one or more embodiments, the transfer criteria 166 includes the chat manager 106 encountering technical problems or errors that hinder the ability of the chat manager 106 to respond adequately. In some embodiments, the transfer criteria 166 includes determining a low likelihood of the chat manager 106 being able to advance the service request towards resolution. The sooner a determination is made that the likelihood of the chat manager 106 of advancing the service request towards resolution is low, the sooner the chat conversation can be transferred to the human agent, thereby reducing the duration of a service request and maintain positive user experiences.

In one or more embodiments, the transfer criteria 166 accounts for availability of human agents with the requisite experience and knowledge to resolve the service request. For example, a service request may include an issue that can be handle by a human agent with vast experience and knowledge and require little or no additional information from the user or the issue can be handled by a human agent with little experience and knowledge and require a wealth of additional information from the user to be collected by the chat manager 106. In some embodiments, when feasible, the chat manager 106 detects the transfer criteria 166 that resolves the service request the quickest, i.e., transfers the chat conversation to the human agent with the vast experience and knowledge, to reduce the length of the chat conversations and maintain positive user experiences.

In one or more embodiments, the transfer criteria 166 includes criteria for transferring conversation from human agent back to the chat manager 106. In embodiments, when the user sentiment is determined to have fallen below or risen above the threshold level that initiated the transfer of the chat conversation to the human agent, the chat manager 106 provides an indication of this change in user sentiment to the human agent and the human agent may decide to transfer control of the chat conversation back over to the chat manager 106. Similarly, when the human agent has resolved the issue for which chat conversation was initially transferred, the human agent may transfer the chat conversation back to the chat manager 106. In some embodiments, transfer of the chat conversation back to the chat manager 106 includes the human agent engaging an interface element on the user interface 112 of the human agent device 104.

In one or more embodiments, the transfer criteria includes inaction by the human agent. When the human agent to which a chat conversation is transferred becomes overwhelmed with chat conversations, or is otherwise distracted from responding to chat conversation, the chat manager 106 may detect the non-responsiveness of the human agent and transfer the chat conversation back to the chat manager 106. Similarly, when the human agent is otherwise preoccupied, the human agent may have an interface element or other means for temporarily transferring the chat conversation back to the chat manager 106 until they are again available.

In one or more embodiments, the transfer criteria 166 are adjusted based on user feedback, analytics, and continuous monitoring of the performance of the chat manager 106 to find a proper balance between automation and human intervention for the best customer experience.

In one or more embodiments, the sentiment pathways 168 are sequences of steps or rules used by the sentiment analyzer 134 to understand, interpret, and appropriately respond to the sentiment or emotional state expressed by a user during a chat conversation. In embodiments, the sentiment pathways 168 enable the chat manager 106 to handle emotions of a user effectively, providing empathetic and contextually appropriate responses. When a user interacts with the chat manager 106, they may express positive, negative, or neutral sentiments, among others, through their language, tone, or choice of words.

In one or more embodiments, when a user expresses positive emotions, such as satisfaction, happiness, or gratitude, the sentiment pathways 168 include acknowledgment and reinforcement. Example responses when detecting a positive user sentiment include, "I'm glad I could assist you! If you have any more questions, feel free to ask," or "Thank you for your kind words! We strive to provide the best service to our users." In embodiments, when a user expresses negative emotions, such as frustration or dissatisfaction, the sentiment pathways 168 include a show of empathy, apologizing if necessary, and offering solutions or escalating the conversation to a human agent. Example responses when detecting a negative user sentiment include, "I'm sorry to hear that you're experiencing difficulties. Let me see if I can help resolve the issue for you," or "I apologize for any inconvenience caused. If I'm unable to assist you, I can transfer you to a human agent who can provide further assistance." In embodiments, when a user sentiment is detected as being neutral or their intent is not clear, the sentiment pathways 168 include asking for clarification or offering general information to guide the conversation. Example responses when detecting a neutral user sentiment include, "I'm not sure I understand your question. Could you please provide more details?" or "Here's some general information that might be helpful. If you need more specific assistance, please let me know."

In one or more embodiments, the sentiment pathways 168 include responding to recognized emotional states. For example, when sentiment analysis determines that the user is getting frustrated, a response generated by the chat manager 106 may include, "I sense that you're feeling frustrated. I'll do my best to help resolve the issue." Similarly, when sentiment analysis determines that the user is getting agitated, a response generated by the chat manager 106 may include, "I understand this can be frustrating. Let's work together to find a solution."

In one or more embodiments, the implementation of sentiment pathways 168 requires continuous improvement and refinement based on user feedback and monitoring of chat conversations.

In one or more embodiments, the intents 170 include examples of both positive and negative intents used to train machine learning models to recognize intents. Examples of positive intents include praise—"Your product is excellent! I love it."; gratitude—"Thank you for your quick response and assistance."; compliments—"Your customer service is outstanding. I had a great experience."; satisfaction—"I'm happy with my purchase. Everything worked perfectly."; enthusiasm—"I can't wait to try out the new features!"; and joy—"I'm so excited about the upcoming event!". Examples of negative intent include complaints—"Your product is not working as advertised. I want a refund."; frustration—"This service is terrible! I've been waiting for hours."; dissatisfaction—"I'm not happy with the quality of the support I received."; disappointment—"I expected better from your company."; anger—"Your website crashed, and I lost all my progress! This is unacceptable."; and criticism—"Your customer service representatives are rude and unhelpful." Recognizing the intent of a user assists the chat manager 106 in generating more meaningful and contextually appropriate responses.

3. Transferring a Chat Conversation to a Human Agent

Figure 2:
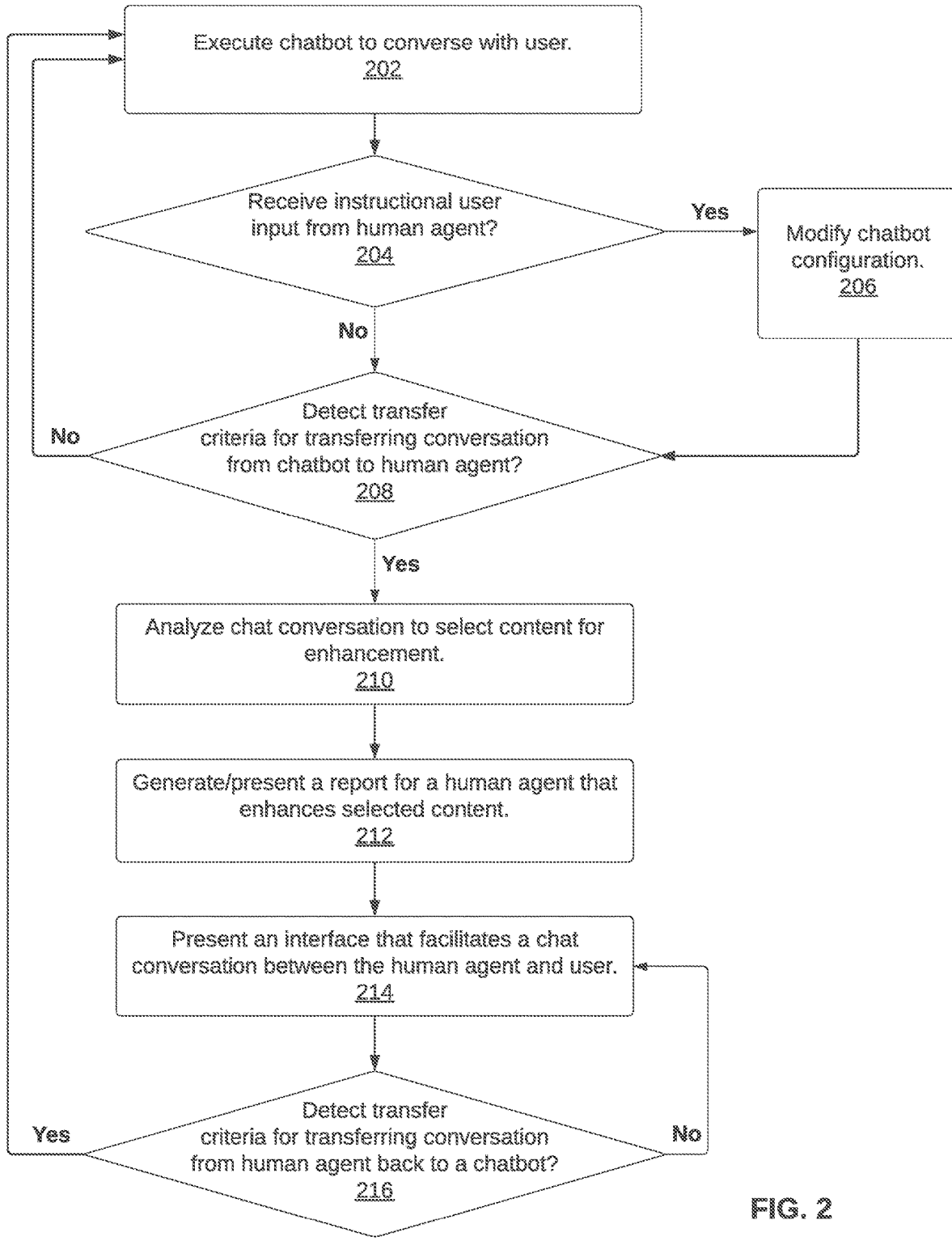
FIG. 2 illustrates an example set of operations for a generative AI chatbot in accordance with one or more embodiments.

FIG. 2 illustrates an example set of operations for transferring a chat conversation to a human agent in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments execute a chatbot to converse with a user. (Operation 202). In embodiments, the chatbot is a generative AI chatbot that uses natural language processing techniques to understand user input, generative models to generate responses, and post processing techniques to refine the responses. In one or more embodiments, the chatbot receives the service request from a user and engages the user to ascertain the type of service request, and to gather information for resolving the service request. In embodiments, the dialogue between the user and the chatbot is conversational. In embodiments, the user may not realize that the responses that they are receiving are computer generated. In one or more embodiments, the chatbot is programed to include customized pleasantries throughout the dialogue. User information for customizing responses may be retrieved from a database of user profiles. In embodiments, the user profile is retrieved from the database when the user engages the chatbot.

In one or more embodiments, the chatbot is trained to handle service requests relating to technical support, product or service inquiries, medical assistance, or other forms of assistance. In some embodiments, the chatbot includes a generative model trained on a knowledge base for the service type the chatbot handles. The knowledge base may also consider an organization or entity supporting the support service and the industry.

In one or more embodiments, the chatbot is hosted on a server. In some embodiments, the chatbot interacts with users through messaging platforms. In some embodiments, executing the chatbot includes integrating the chatbot with a messaging platform.

In one or more embodiments, the user engages the chatbot by logging in through a website or an app. In other embodiments, the user engages the chatbot by entering a message in a chat box of a messenger service or other application. In still other embodiments, the user engages the chatbot using a voice assistant.

In one or more embodiments, a user identifies themselves when engaging the chatbot. Identifying the user may be accomplished automatically by the chatbot when user information is available for identifying the user without a direct inquiry to the user. When engaging the chatbot requires logging in, the user information is automatically provided to the chatbot. A previously used IP address may also be used to identify a user, as well as a previously used username or handle. In some embodiments, when the identity of the user is not known or is in question, the chatbot uses generative AI models to generate dialogue to inquire about the identity of the user.

In instances when knowing the identity of the user is not necessary for resolving the service request, possessing the name of the user allows the chatbot to personalize the chat conversation. Knowing the name of the user also allows the chatbot to create a user profile for the user that is saved in the user profile database. By maintaining a user profile for the user, the chatbot may reference the user profile during future interactions with the user. In some embodiments, the user profiles generated by the chatbot are also used with a support service operated through e-mailed service requests.

In one or more embodiments, the chatbot converses with the user with the intent of gathering all relevant information pertaining to a service request. In some embodiments, the purpose of the chatbot is not to resolve the service request, however, resolving the service request may result as a consequence of the information gathering.

The user may engage with the chatbot through a graphical user interface of a computer, smartphone, or other device. In embodiments, the chatbot is accessed through a website or an application. In some embodiments, the chatbot is accessed through a messaging platform. In other embodiments, the chatbot is accessed through a voice assistant with responses from the chatbot delivered as voice output through the voice assistant.

In one or more embodiments, executing the chatbot includes assigning one or more human agents to monitor conversations of the chatbot. The chatbot may handle multiple conversations at the same time. A single human agent or multiple human agents may handle the same conversations. In one or more embodiments, as the conversation between the user and the chatbot progresses, the human agent is able to monitor the conversation in real-time or near real-time. In some embodiments, the human agent monitors multiple chat conversations with multiple different users. The multiple conversations may be of the same service request type, or different service request types.

To alleviate the burden on the human agent, and permit speedier responses, the chatbot may include a ranking system for responses generated by the chatbot. The ranking system may be indicated on the interface displaying the conversations. Responses may be ranked from benign or non-controversial to potentially inflammatory or controversial. In one or more embodiments, generated responses that are deemed by the chatbot as benign, require no human agent review, and may be output to the user immediately. Responses that have the potential to be inflammatory or controversial are not output to the user without intervention by the human agent. Responses that fall between benign and potentially inflammatory may be output to the client following a pause to allow for human agent intervention. In some embodiments, the length of the pause depends on the determined severity of the response. A response deemed slightly controversial will be output sooner than a response deemed moderately controversial. The pause in responding allows the human agent the opportunity to provide instruction to the chatbot. In embodiments, the chatbot provides the human agent indication of the possibility for intervention with visual, audible and/or haptic cues.

In one or more embodiments, the chatbot uses sentiment analysis to determine and track the mood of the user. The determined sentiment of the user may be used to generate response that are responsive to the real-time or near real-time sentiment of the user.

In one or more embodiments the chatbot receives instructional user input from human agent. (Operation 204). The one or more human agents monitoring the chat conversation between the chatbot, and the user are able to provide instruction to the chatbot. In embodiments, the instructions provided by the human agent approve a response generated by the chatbot or request the chatbot to regenerate or modify the response. Instructional user input from the human agent may include the human agent adjusting the sensitivity of the response or the amount of risk the chatbot uses in generating a response. In some embodiments, the instructional user input adjusts the level of confidence required by the chatbot to automatically output a response, i.e., without human agent approval. In some embodiments, receiving instructional user input from the human agent includes not receiving a response in the time allotted by the chatbot for the human agent to respond.

In one or more embodiments, the chatbot includes an interface element corresponding to each response generated by the chatbot. In embodiments, the interface elements provide the human agent with a means to approve the response. In some embodiments, the interface element provides the human agent with a means to adjust the sensitivity of the generated responses, or the level of confidence required to automatically output a response.

In one or more embodiments, the human agent instruction includes a comment or feedback not visible to the user that may be used later for review and training purposes. The feedback may include highlighting or tagging the message for exceptional responses-good and bad. The display of the conversation on the device of the human user may include one or more interface elements or text boxes for annotating the comments.

One or more embodiments modify the configuration of the chatbot upon receipt of instructional user input from the human agent. (Operation 206). In embodiments, when the chatbot receives instructional user input from the human agent that approves the generated response, or when the allotted time provided to the human agent for rejecting a response has elapsed, the chatbot outputs the generated response. In embodiments, when the chatbot receives instructional user input that requests that the chatbot regenerate the response because the response is too controversial or does not take enough risk, the configuration of the chatbot is modified prior to the new response being generated to account for the received instructional user input from the human agent instruction.

In one or more embodiments, when the instructional user input includes adjusting the speed of the response, the chatbot modifies the speed at which responses are output. This, may for example, include speeding up the output of responses, slowing down the output of responses, and stalling.

One or more embodiments detects transfer criteria for transferring conversation from chatbot to human agent. (Operation 208). Transfer criteria may differ depending on the type of service request. Transfer criteria for transferring a chat conversation from the chatbot to a human agent for a chat conversation seeking technical support may be different from a chat conversation seeking medical support or for a chat conversation concerning a product or service inquiry.

Transfer criteria may include the customer expressing frustration or dissatisfaction, the user explicitly requesting to speak with a human agent or asks for live assistance, determining that the service request is overly complex or involves multiple topics, determining that the duration of the chat conversation exceeds a threshold duration, determining the number of unsuccessful attempts by the chatbot to resolve the issue exceeds a threshold amount, an inability of the chatbot to determine the intent of the user, or determining that the user is expressing strong emotions or is discussing sensitive topics.

In one or more embodiments, periodic or continuous sentiment analysis allows the chatbot to monitor the sentiment of the user throughout the conversation. In some embodiments, the transfer criteria includes a particular sentiment or group of sentiments exceeding or falling below a specified threshold. Similarly, the transfer criteria may include a particular sentiment or group of sentiments remaining above or below a specified threshold for a specified duration.

In one or more embodiments, even after detection of the transfer criteria, the chatbot and/or human agent may decide to continue the conversation without transferring the conversation over to the human agent.

As described above, in one or more embodiments, the transfer criteria applied during a particular chat conversation accounts for availability of a human agent with the requisite experience and knowledge to resolve the service request.

One or more embodiments analyze the chat conversation to select content for enhancement. (Operation 210). Over the course of the chat conversation, the chatbot is continuously monitoring the dialogue of the chat conversation to identify content that may be relevant to resolving the service request. The relevant content may be different for different types of service requests. The content that is selected for enhancement may change over the course of the chat conversation as the issues being addressed become clearer or as issues are resolved or are determined to be of less importance. The selected content for enhancement may also differ based on the human agent that the chat conversation will be transferred.

One or more embodiments generate/present a report for a human agent that enhances selected content. (Operation 212). In embodiments, the select content that was identified during analysis of the chat conversation is provided in a report that is generated for the human agent. In some embodiments, the content selected for enhancement is information that the chatbot determined to be relevant for a human agent in resolving the chat conversation. The report may include color coding, bolding, and/or highlighting of the selected content and/or a summary of the selected content. In embodiments, the selected content is organized in a manner most conducive to resolving the service request. In some embodiments, the content selected is customized for the human agent receiving the transferred chat conversation. In embodiments, the information in the report is ranked based on how the human agent typically handles similar service requests and/or includes additional information to supplement the knowledge of the human agent. By providing reports customized to the human agent, the speed and efficiency with which the human agent may be brought up to speed on a service request and, ultimately resolve the service request, is significantly increased.

One or more embodiments present interface that facilitates a chat conversation between human agent and a user. (Operation 214). When a chat conversation is transferred to a human agent for resolution of the service request, the human agent is able to access responses from the user and respond to the responses from the user through the interface. In some embodiments, the interface includes interface elements. In embodiments, the interface element includes a button for transferring the chat conversation back to the chatbot. The human agent is able to enter a response to the user through the interface.

One or more embodiments detect transfer criteria for transferring the chat conversation from human agent back to a chatbot. (Operation 216). In embodiments, transfer criteria for transferring the chat conversation back to the chatbot from the human agent includes determining that user sentiment has fallen below or risen above the threshold level that initiated the transfer of the chat conversation to the human agent. In some embodiments, the chatbot provides indication of the change in user sentiment to the human agent. The human agent may decide to transfer control of the chat conversation back over to the chatbot. Alternatively, the human agent may decide to maintain control of the chat conversation and elects refrain from transferring the chat conversation back to the chatbot. In some embodiments, the transfer of the chat conversation back to the chatbot is automatically performed by the chatbot when the transfer criteria is met.

In one or more embodiments, the transfer criteria for transferring the chat conversation back to the chatbot includes resolution of the issue for which the chat conversation was initially transferred. In some embodiments, transfer criteria for transferring the chat conversation back to the chatbot from the human agent includes inaction by the human agent, i.e., after a prolonged period of no response from the human agent.

4. Example Chat Conversation

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
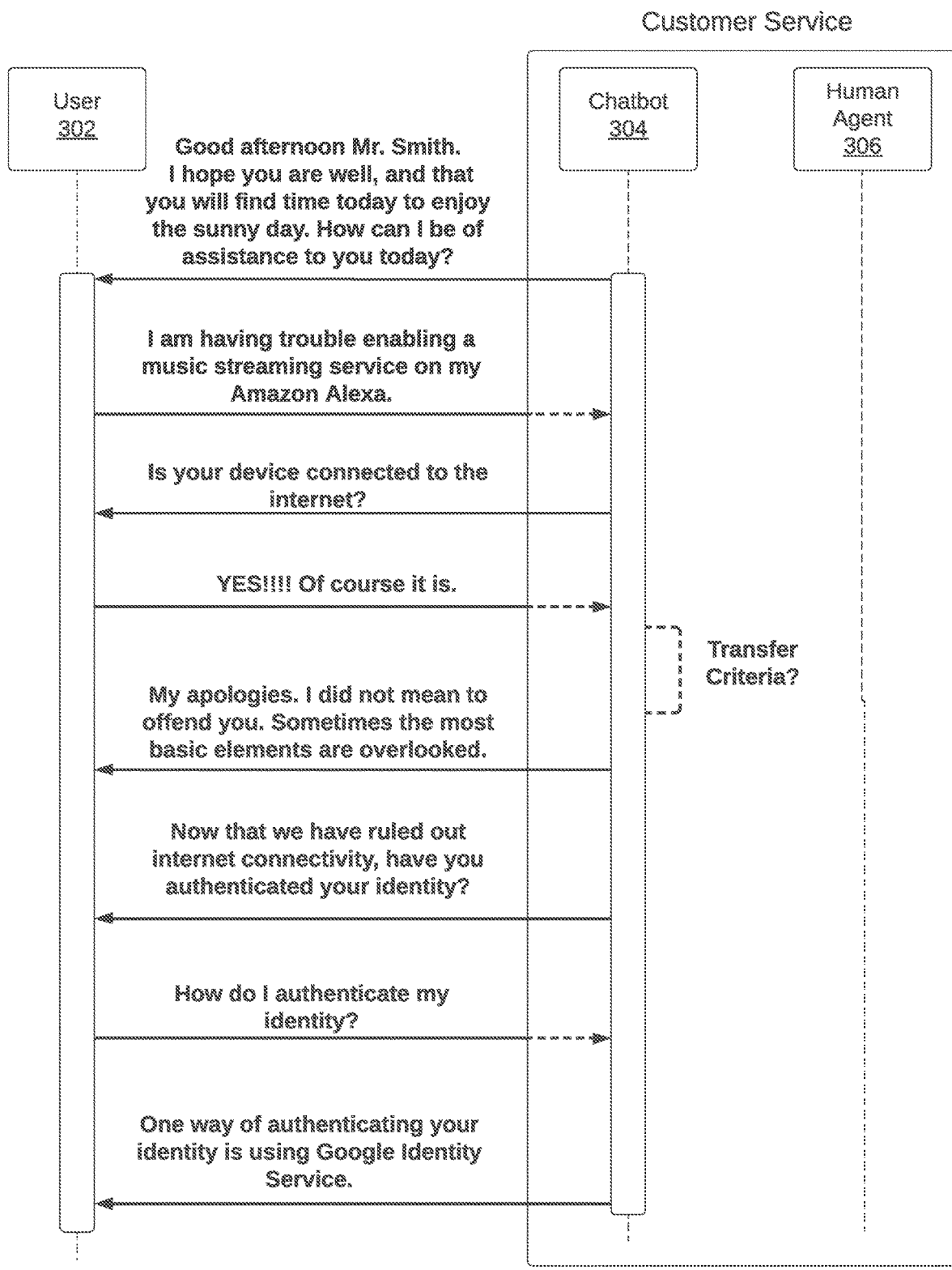
FIGS. 3A and 3B are an activity diagram illustrating dialogue of a chat conversation between a user and customer service.
Figure 3B:
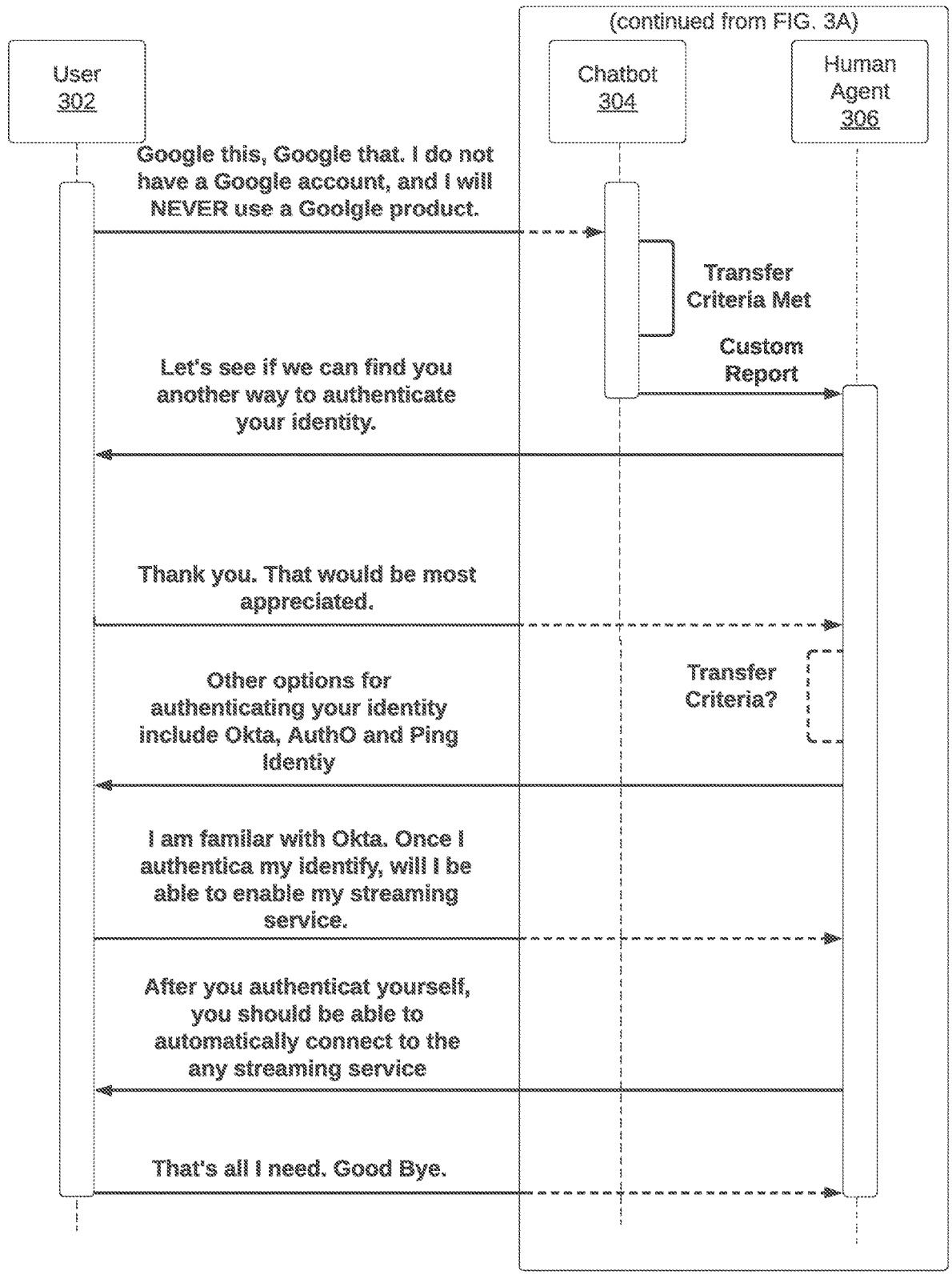

FIGS. 3A and 3B illustrate dialogue of a chat conversation comprising a service request. The chat conversation is between a user 302 and customer service, represented by a chatbot 304 and a human agent 306. From the perspective of the user 302, all responses are received from customer service, regardless of if they are generated by the chatbot 304 or are prepared by the human agent 306. Similarly, all responses sent by the user 302 are perceived by the user 302 to be received by customer service regardless of if they are received by the chatbot 304 or the human agent 306.

Throughout the chat conversation, the human agent 306 has access to the dialogue of the chat conversation and may be monitoring the interaction between the user 302 and the chatbot 304. At any point during the chat conversation, the human user 306 may transfer control of the chat conversation over to themselves.

The chat conversation between the user 302 and customer service may be initiated through a chat box on a website or in app or using a messaging service. Alternatively, the chat conversation may be initiated by the user through a voice assistant.

In instances where the user 302 has accessed customer service previously or a user profile was otherwise generated for the user 302, the chatbot 304 accesses the user profile to identify preferences of the user 302, attributes and temperament of the user 302, knowledge or experience of the user 302 or any other information that might be useful in personalizing or more efficiently resolving the service request.

Once the connection between the user 302 and customer service is established, the chatbot 304 begins the conversation with a personalized greeting and an inquiry into the purpose of the service request. When the user 302 is not previously known to the chatbot 304, i.e., no user profile is available, the greeting may be personalized based on information provided by the user 302 or by referencing the user's location through their IP address or in any other manner.

Lacking any perceived potential for being controversial or even potentially controversial, the chatbot 304 outputs the response independently, i.e., without approval from the human agent 306. As the chat conversation was only just initiated, there was no input for the chatbot 304 to analyze to determine user sentiment. In instances where the chatbot 304 has access to a user profile for the user 302, the chatbot 304 may further personalize the greeting and/or take into consideration sensitivities of the user 302.

Alternatively, the chat conversation may be started by the user, either with a greeting or by detailing the reason for the service request.

As detailed in dialogue, the issue that the user 302 is attempting to resolve with the service request is enabling a music streaming service on their Amazon Alexa. Because sometimes the simplest solution may resolve the issue or because this solution has been shown to resolve the issue more times than not or because one doesn't get to step two before completing step one, the chatbot 304 generates a response asking the user 302 if their device is connected to the internet. Since the generated response appears to have little potential for controversy, the chatbot 304 once again outputs the response independently.

Based on the response of the user 302, the chatbot 304 detects a negative user sentiment. For example, the capitalized "YES" or the multiple exclamation points can be interpreted by the chatbot 304 as an expression of frustration. Similarly, the statement "Of course it is." can be detected as negative user sentiment. Depending on the sensitivity levels set for transfer criteria, this response by the user 302 may meet the transfer criteria as exceeding the threshold for negative user sentiment. Had the chat conversation already had an overall negative user sentiment, this response may have met the transfer criteria as exceeding the duration threshold for negative user sentiment.

Had the chatbot 304 had access to a user profile that detailed that the user 302 has a bad temperament or is easily offended, the chatbot 304 would have generated a response that was sensitive to the user's temperament. When the chatbot 304 is aware that the user 302 is easily offended, the chatbot 304 is programmed to include a lead-in to questions that may be perceived as simple, thereby cushioning the ego of the user 302. For example, the chatbot 304 may have expressed that it was only asking the question because everyone is asked the same question or provided a softening statement that sometimes the easiest of solutions is the solution.

At this point in the chat conversation, the chatbot 304 provides indication to the human agent 306 of the change detected in the user sentiment. The chatbot 304 also provides a pause to allow the human agent 306 to intervene. If the human agent 306 is available and determines that a transfer is necessary, the human agent 306 transfers the chat conversation over to their control. As seen in the dialogue of the chat conversation, the human agent 306 was either unavailable for the transfer or determined that a transfer was not necessary, and the chatbot 304 resumed the conversation.

In response to the negative user sentiment detected by the chatbot 304, the chatbot 304 generated a response attempting to ease or otherwise settle the user 302. The response generated by the chatbot 304 apologized for upsetting the user 302, expressed an intent not to offend the user 302, and provided a reason for the inquiry. Having received no immediate response, the chatbot 304 inferred that the user 302 had calmed sufficiently that the conversation could continue.

In an attempt to advance the service request to a resolution, the chatbot 304 generated a response asking if the user had authenticated their identity. Once again, detecting a low potential for controversy, the chatbot 304 independently output the response to the user 302.

Sentiment analysis of the response by the user 302 to the inquiry by the chatbot 304, did not detect any negative sentiment. Thus, the chatbot 304 determined that the chat conversation could continue.

In generating the response to the inquiry by the user 302, the best response include reference to a product of a competitor. While the potential for controversy in providing the response was relatively low, the user's previous reaction and the referencing of a competitor's product in the response caused the chatbot 304 to pause before outputting the response. The pause in outputting the response was accompanied by an indication to the human agent of the reference to the competitor in the response and the potential for the user 302 to react strongly. After the requisite period for human agent intervention had passed, the chatbot 304 output the response.

Detecting a change in user sentiment based on the response of the user 302, e.g., capitalized "NEVER" and strong language, coupled with the previous detection of negative user sentiment, the chatbot 304 determined that the transfer criteria had been met for exceeding the threshold negative user sentiment. In preparation for automatically transferring the chat conversation to the human agent 306, the chatbot 304 prepared a custom report to provide to the human agent 304. The custom report summarized the chat conversation and included enhancements to select content that the chatbot 304 determined would assist the human agent 306 in resolving the service request. The custom report highlighted the affirmative and defensive response of the user 302 to being asked about their device being connected to the internet, the outstanding issue of authenticating the user 302, and the volatile temperament of the user 302.

Once the chat conversation was transferred to the human agent 306, the human agent 306 was able to quickly review the custom report and get up to speed on the chat conversation before responding to the previous outburst by the user 304.

In response to the statement by the human agent 306, sentiment analysis determined that the negative user sentiment had once again fallen below the threshold. The chatbot 304 then provided indication to the human agent 306 of the change in negative user sentiment and the possibility of transferring the chat conversation back to the chatbot 304. Despite the indication provided to the human agent 306 of the change in negative user sentiment, the human agent 306 decided to maintain control of the chat conversation and continue the chat conversation to resolution.

If at any point from the detection of the change in user sentiment through the end of the chat conversation, the human agent 306 had decided to transfer the chat conversation back to the chatbot 304, the human agent 306 would have engaged an interface element that would have initiated the transfer back to the chatbot 304. Based on the exchange between the human agent 306 and the user 302, the chatbot 304 would have likely been able to brought the service request to resolution without further issue.

5. Enhancing a Chatbot Conversation for Presentation to a Human Agent

One or more embodiments analyze a chat conversation between a chatbot and a user to select a particular portion of the chat conversation for enhancement and reporting to a human agent who will continue the conversation with the user. A non-transitory computer readable medium includes instructions which, when executed by one or more hardware processors, causes performance of operations that include executing a chatbot for engaging in a chat conversation with a user. Executing the chatbot includes generating, using the chatbot, a plurality of outbound messages comprised in the chat conversation, the plurality of outbound messages requesting information corresponding to a service request. Executing the chatbot further includes transmitting the plurality of outbound messages to a client device associated with the user; and receiving, from the client device, a plurality of inbound messages comprised in the chat conversation. The plurality of inbound messages comprise the information corresponding to the service request. Executing the chatbot also includes analyzing the chat conversation to select a particular portion of the chat conversation for enhancement relative to one or more other portions of the chat conversation, generating a report, corresponding to the chat conversation, that enhances the particular portion of the chat conversation relative to the one or more other portions of the chat conversation, and transferring the chat conversation to the human agent. Transferring the chat conversation to the human agent may include presenting, to the human agent, the report and a graphical chat interface configured for displaying messages between the human agent and the user, and presenting interface elements, in association with the chat interface, for receiving user input from the human agent for transmission to the user.

In one or more embodiments the report enhances the particular portion of the chat conversation relative to the one or more other portions of the chat conversation by applying an annotation to the particular portion of the chat conversation without applying the annotation to the one or more other portions of the chat conversation.

One or more embodiments enhance the particular portion of the chat conversation relative to the one or more other portions of the chat conversation by including the particular portion of the chat conversation in a summary for the human agent without including the one or more other portions of the chat conversation in the summary for the human agent.

Generating the report may include generating a ranking that ranks the particular portion of the chat conversation at a higher rank than the one or more other portions of the chat conversation. The content in the report may be organized based on the ranking.

One or more embodiments identify content, to present to the human agent, based on an evaluation of the human agent's experience and/or education and characteristics of the service request. Generating the report may include structuring the report based on behavior data associated with the human agent. The behavior data may include a sequence of tasks executed by the human agent when handling service requests of a same category as said service request.

6. Generating Recommendations Associated with Outbound Chatbot Messages

One or more embodiments generate recommendations associated with outbound chatbot messages based on performance scores for the outbound chatbot messages. The recommendations may include reports to management. A non-transitory computer readable medium comprising instructions which, when executed by one or more hardware processors, causes performance of operations that include executing a chatbot for engaging in a chat conversation with a user. Executing the chatbot includes generating, using the chatbot, a plurality of outbound messages comprised in the chat conversation, the plurality of outbound messages requesting information corresponding to a service request. Executing the chatbot further includes transmitting the plurality of outbound messages to a client device associated with the user, and receiving, from the client device, a plurality of inbound messages comprised in the chat conversation, the plurality of inbound messages comprising the information corresponding to the service request. Executing the chatbot also includes identifying a target subset of one or more outbound messages, from the plurality of outbound messages generated by the chatbot, for performance evaluation, and determining that a particular subset of inbound messages, of the plurality of inbound messages received from the user, are responsive to the target subset of outbound messages. Executing the chatbot further includes determining a performance score for the target subset of one or more outbound messages based at least on the particular subset of inbound messages that are responsive to the target subset of outbound messages, and generating a recommendation associated with the target subset of one or more outbound messages based on the performance score.

7. Real-Time Reconfiguration of a Chatbot During Chatbot Execution

One or more embodiments reconfigure a chatbot in real-time during a chat conversation based on instructional human agent input. A non-transitory computer readable medium includes instructions which, when executed by one or more hardware processors, causes performance of operations including executing a chatbot for engaging in a chat conversation with a user. Executing the chatbot includes generating, using the chatbot configured in accordance with a first configuration, a first plurality of outbound messages comprised in the chat conversation, and transmitting the first plurality of outbound messages to a client device associated with the user. Executing the chatbot further includes receiving, from the client device, a plurality of inbound messages comprised in the chat conversation, wherein at least one of the plurality of inbound messages is responsive to at least one of the first plurality of outbound messages generated by the chatbot. Concurrently with executing the chatbot, displaying a chat interface to a human agent, the chat interface displaying both the first plurality of outbound messages generated by the chatbot and the plurality of inbound messages comprised in the chat conversation, wherein the messages in the chat conversation are displayed in real-time as they are transmitted between the chatbot and the user. Executing the chatbot also includes receiving instructional user input from a human agent during the chat conversation between the chatbot and the user, based on the instructional user input, modifying the first configuration for the chatbot to generate a second configuration for the chatbot, generating, using the chatbot configured in accordance with the second configuration, a second plurality of outbound messages comprised in the chat conversation, transmitting the second plurality of outbound messages to the client device, and displaying the second plurality of outbound messages in the chat interface in real-time as they are transmitted to the client device.

One or more embodiments includes a slider to configure chatbot, e.g., adjust risk level, configure how sensitive the chatbot is in blocking potentially sensitive/offensive/negative messages. Some embodiments include configuring a speed with which the chatbot generates and/or sends messages.

8. Seamlessly Transitioning Conversations Back and Forth Between Human Agents and Chatbots One or more embodiments provide seamless transitions between a chatbot and a human agent to converse with a user. Seamless transitions may include pausing the chatbot for human agent to temporarily take over a conversation with the user and subsequently resuming the chatbot. A non-transitory computer readable medium includes instructions which, when executed by one or more hardware processors, causes performance of operations including executing a chatbot for engaging in a chat conversation with a user. Executing the chatbot includes generating, using the chatbot configured in accordance with a first configuration, a plurality of outbound messages comprised in the chat conversation, and transmitting the plurality of outbound messages to a client device associated with the user. Executing the chatbot further includes receiving, from the client device, a plurality of inbound messages comprised in the chat conversation, wherein at least one of the plurality of inbound messages is responsive to at least one of the first plurality of outbound messages generated by the chatbot. Concurrently with executing the chatbot, displaying a chat interface to a human agent, the chat interface displaying both the plurality of outbound messages generated by the chatbot and the plurality of inbound messages comprised in the chat conversation, wherein the messages in the chat conversation are displayed in real-time as they are transmitted between the chatbot and the user. Responsive to receiving a first command to pause the chatbot, pausing the generation of the plurality of outbound messages by the chatbot and receiving one or more chat messages from the human agent via interface elements associated with the chat interface, transmitting the one or more chat messages from the human agent to the client device and displaying the one or more chat messages in the chat interface being displayed to the human agent. Responsive to receiving a second command to resume the chatbot, resuming the generation of the plurality of outbound messages by the chatbot for transmission to the client device.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
    executing a chatbot for engaging in a chat conversation with a user, wherein executing the chatbot comprises:
        generating, using the chatbot, a plurality of outbound messages comprised in the chat conversation, the plurality of outbound messages requesting information corresponding to a service request;

transmitting the plurality of outbound messages to a client device associated with the user;
receiving, from the client device, a plurality of inbound messages comprised in the chat conversation, the plurality of inbound messages comprising the information corresponding to the service request;
based at least on the plurality of inbound messages, detecting that one or more transfer criteria has been met to transfer the chat conversation with the user from the chatbot to a human agent;
wherein the one or more transfer criteria comprises one or more user sentiment criteria,
wherein detecting that the one or more transfer criteria has been met comprises:
  determining user sentiment associated with the user based at least on the plurality of inbound messages, and
  determining that the user sentiment meets the one or more user sentiment criteria based on at least one of:
    i) determining that the user sentiment remains above a first threshold value for a first predetermined duration of time, or
    ii) determining that the user sentiment falls below a second threshold value for a second predetermined duration of time;
generating a report, corresponding to the chat conversation, based at least on the plurality of inbound messages;
wherein the report comprises conversation metadata that is (a) derived from an analysis of the chat conversation, (b) is different than the plurality of inbound messages, and (c) is different than the plurality of outbound messages; and
transferring the chat conversation to the human agent at least by:
  presenting, to the human agent, the report and a graphical chat interface configured for displaying messages between the human agent and the user; and
  presenting interface elements, in association with the graphical chat interface, for receiving user input from the human agent for transmission to the user.

2. The one or more non-transitory computer readable media of claim 1, wherein executing the chatbot further comprises:
determining the one or more transfer criteria at least by:
  determining a type of the service request based on one or more of the plurality of inbound messages; and
  determining the one or more transfer criteria based on the type of the service request.

3. The one or more non-transitory computer readable media of claim 1, wherein detecting that the one or more transfer criteria has been met comprises determining that the information comprised in the plurality of inbound messages meets a completion criteria associated with the service request.

4. The one or more non-transitory computer readable media of claim 1, wherein executing the chatbot comprises:
terminating the chatbot in response to detecting the one or more transfer criteria has been met.

5. The one or more non-transitory computer readable media of claim 1, wherein executing the chatbot comprises:
populating the graphical chat interface with the chat conversation between the chatbot and the user.

6. The one or more non-transitory computer readable media of claim 1, wherein the one or more user sentiment criteria includes determining that the user sentiment exceeds a first threshold value or falls below a second threshold value.

7. The one or more non-transitory computer readable media of claim 1, wherein transmitting the plurality of outbound messages to the client device associated with the user includes receiving approval from the human agent.

8. The one or more non-transitory computer readable media of claim 1, wherein executing the chatbot comprises:
detecting that one or more second transfer criteria has been met to transfer the chat conversation with the user from the human agent back to the chatbot.

9. The one or more non-transitory computer readable media of claim 1, wherein the conversation metadata flags a portion of the chat conversation.

10. The one or more non-transitory computer readable media of claim 1, wherein the conversation metadata comprises at least one of: a summary, a topic identification, or a sentiment identification corresponding to at least a portion of the chat conversation.

11. A method comprising:
executing a chatbot for engaging in a chat conversation with a user, wherein executing the chatbot comprises:
  generating, using a chatbot, a plurality of outbound messages comprised in a chat conversation, the plurality of outbound messages requesting information corresponding to a service request;
  transmitting the plurality of outbound messages to a client device associated with the user;
  receiving, from the client device, a plurality of inbound messages comprised in the chat conversation, the plurality of inbound messages comprising the information corresponding to the service request;
  based at least on the plurality of inbound messages, detecting that one or more transfer criteria has been met to transfer the chat conversation with the user from the chatbot to a human agent;
  wherein the one or more transfer criteria comprises one or more user sentiment criteria,
  wherein detecting that the one or more transfer criteria has been met comprises:
    determining user sentiment associated with the user based at least on the plurality of inbound messages, and
    determining that the user sentiment meets the one or more user sentiment criteria based on at least one of:
      i) determining that the user sentiment remains above a first threshold value for a first predetermined duration of time, or
      ii) determining that the user sentiment falls below a second threshold value for a second predetermined duration of time;
  generating a report, corresponding to the chat conversation, based at least on the plurality of inbound messages;
  wherein the report comprises conversation metadata that is (a) derived from an analysis of the chat conversation, (b) is different than the plurality of inbound messages, and (c) is different than the plurality of outbound messages; and
  transferring the chat conversation to the human agent at least by:
    presenting, to the human agent, the report and a graphical chat interface configured for displaying messages between the human agent and the user; and presenting interface elements, in association with the graphical chat interface, for receiving user input from the human agent for transmission to the user.

12. The method of claim 11, wherein executing the chatbot further comprises: determining the one or more transfer criteria at least by:
   determining a type of the service request based on one or more of the plurality of inbound messages; and
   determining the one or more transfer criteria based on the type of the service request.

13. The method of claim 11, wherein detecting that the one or more transfer criteria has been met comprises determining that the information comprised in the plurality of inbound messages meets a completion criteria associated with the service request.

14. The method of claim 11, wherein executing the chatbot further comprises: terminating the chatbot in response to detecting the one or more transfer criteria has been met.

15. The method of claim 11, wherein executing the chatbot further comprises: populating the graphical chat interface with the chat conversation between the chatbot and the user.

16. The method of claim 11, wherein the one or more user sentiment criteria includes determining that user sentiment exceeds a first threshold value or falls below a second threshold value.

17. The method of claim 11, wherein transmitting the plurality of outbound messages to the client device associated with the user includes receiving approval from the human agent.

18. The method claim 11, wherein executing the chatbot further comprises:
   detecting that one or more second transfer criteria has been met to transfer the chat conversation with the user from the human agent back to the chatbot.

19. A system comprising:
   one or more processors; and
   memory storing instructions that, when executed by the one or more processors, cause the system to perform:
      executing a chatbot for engaging in a chat conversation with a user, wherein executing the chatbot comprises:
         generating, using the chatbot, a plurality of outbound messages comprised in the chat conversation, the plurality of outbound messages requesting information corresponding to a service request;
         transmitting the plurality of outbound messages to a client device associated with the user;
         receiving, from the client device, a plurality of inbound messages comprised in the chat conversation, the plurality of inbound messages comprising the information corresponding to the service request;
      based at least on the plurality of inbound messages, detecting that one or more transfer criteria has been met to transfer the chat conversation with the user from the chatbot to a human agent;
      wherein the one or more transfer criteria comprises one or more user sentiment criteria,
      wherein detecting that the one or more transfer criteria has been met comprises:
         determining user sentiment associated with the user based at least on the plurality of inbound messages, and
         determining that the user sentiment meets the one or more user sentiment criteria based on at least one of:
            i) determining that the user sentiment remains above a first threshold value for a first predetermined duration of time, or
            ii) determining that the user sentiment falls below a second threshold value for a second predetermined duration of time;
      generating a report, corresponding to the chat conversation, based at least on the plurality of inbound messages;
      wherein the report comprises conversation metadata that is (a) derived from an analysis of the chat conversation, (b) is different than the plurality of inbound messages, and (c) is different than the plurality of outbound messages; and
      transferring the chat conversation to the human agent at least by:
         presenting, to the human agent, the report and a graphical chat interface configured for displaying messages between the human agent and the user; and
         presenting interface elements, in association with the chat interface, for receiving user input from the human agent for transmission to the user.

20. The one or more non-transitory computer readable media of claim 1, wherein content of the report is presented in a manner customized for the human agent.

21. The one or more non-transitory computer readable media of claim 1, wherein the report further comprises visual enhancements to select content of the report.

22. The one or more non-transitory computer readable media of claim 1, wherein the report further comprises information associated with past interactions with the user.

23. The one or more non-transitory computer readable media of claim 1, wherein the report comprises links to previous chat conversations with the user.

* * * * *

UNITED STATES PATENT AND TRADEMARK OFFICE
CERTIFICATE OF CORRECTION

PATENT NO. : 12,231,380 B1  
APPLICATION NO. : 18/485053  
DATED : February 18, 2025  
INVENTOR(S) : Rodgers et al.

Page 1 of 1

It is certified that error appears in the above-identified patent and that said Letters Patent is hereby corrected as shown below:

In the Drawings

On sheet 1 of 5, FIG. 1, under Reference Numeral 150, Line 2, delete "Archiitecture" and insert -- Architecture --, therefor.

On sheet 4 of 5, FIG. 3B, Line 20, delete "authentica" and insert -- authenticate --, therefor.

On sheet 4 of 5, FIG. 3B, Line 23, delete "authenticat" and insert -- authenticate --, therefor.

In the Specification

In Column 17, Line 62, delete "n." and insert -- n, --, therefor.

In Column 22, Line 24, delete "Word2Vec." and insert -- Word2Vec, --, therefor.

In Column 32, Line 50, delete "106t" and insert -- 106 --, therefor.

In the Claims

In Column 51, Line 33, in Claim 18, delete "method" and insert -- method of --, therefor.

Signed and Sealed this  
Sixth Day of May, 2025

Coke Morgan Stewart  
*Acting Director of the United States Patent and Trademark Office*